United States Patent
Matsunaga et al.

(10) Patent No.: US 7,103,107 B2
(45) Date of Patent: Sep. 5, 2006

(54) DEMODULATOR, RECEIVER, AND COMMUNICATION SYSTEM

(75) Inventors: Mari Matsunaga, Tokyo (JP); Toshiharu Kojima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 648 days.

(21) Appl. No.: 09/726,533

(22) Filed: Dec. 1, 2000

(65) Prior Publication Data

US 2001/0026593 A1 Oct. 4, 2001

(30) Foreign Application Priority Data

Mar. 17, 2000 (JP) .............................. 2000-076898

(51) Int. Cl.
  H04L 5/12 (2006.01)
  H04L 23/02 (2006.01)
  H04L 27/06 (2006.01)
  H03D 1/00 (2006.01)

(52) U.S. Cl. ...................................... 375/262; 375/341

(58) Field of Classification Search ................ 375/262, 375/265, 283, 330, 331, 340, 341; 329/304; 714/792, 794, 795, 786, 780
See application file for complete search history.

(56) References Cited

U.S. PATENT DOCUMENTS

| | | | | |
|---|---|---|---|---|
| 5,335,250 A | * | 8/1994 | Dent et al. ................... | 375/224 |
| 5,706,313 A | * | 1/1998 | Blasiak et al. ............... | 375/330 |
| 5,844,946 A | * | 12/1998 | Nagayasu ..................... | 375/341 |
| 5,995,562 A | * | 11/1999 | Koizumi ...................... | 375/341 |
| 5,996,104 A | * | 11/1999 | Herzberg ..................... | 714/755 |
| 6,269,124 B1 | * | 7/2001 | Nagayasu et al. .......... | 375/262 |
| 6,301,684 B1 | * | 10/2001 | Watanabe et al. ........... | 375/341 |
| 6,574,283 B1 | * | 6/2003 | Sakoda et al. .............. | 375/262 |
| 6,574,775 B1 | * | 6/2003 | Chouly ........................ | 714/800 |

FOREIGN PATENT DOCUMENTS

| | | |
|---|---|---|
| JP | 4-219028 | 8/1992 |
| JP | 6-237280 | 8/1994 |
| JP | 8-307283 | 11/1996 |
| JP | 9-205465 | 8/1997 |

OTHER PUBLICATIONS

Joachim Hagenauer, et al., "A Viterbi Algorithm with Soft-Decision Outputs and its Applications", GLOBECOM, XP-10083731, 1989, pp. 1680-1686.

Toshiharu Kojima, et al., "Differential Detection Scheme for DPSK Using Phase Sequence Estimation," Technical Report of IEICE, RCS92-102, Jan. 1993, pp. 19-24.

T. Kojima, et al., Electronics and Communications in Japan, Part 1, vol. 77, No. 12, XP-000505190, pp. 88-100, "Differential Detection Scheme for DPSK Using Phase Sequence Estimation", Dec. 1, 1994.

J. I. Park, et al., IEEE International Conference on Montreal, XP-010227004, pp. 1503-1507, "Soft Output Equalization Techniques for PI/4-DQPSK Mobile Radio", Jun. 8-12, 1997.

* cited by examiner

*Primary Examiner*—Betsy L. Deppe
(74) *Attorney, Agent, or Firm*—Oblon, Spivak, McClelland, Maier & Neustadt, P.C.

(57) ABSTRACT

A demodulator in a receiver has a multiple symbol differential phase detector which calculates phase differences between a received signal and received signals of 1, 2, . . . , N (Where N is an integer greater than 2) before so as to output the calculated results as N symbol differential phase detected signals. Further, a soft decision sequence estimating unit in this demodulator estimates a transmitted differential phase sequence according to the 1, 2, . . . , N symbol differential phase detected signals using a trellis diagram representing transitions of differential phase states of a transmitted signal and Viterbi algorithm and estimates soft decision demodulated data according to estimated transmitted differential phase sequence and the survival path metrics that transit into each state on the trellis diagram.

15 Claims, 10 Drawing Sheets

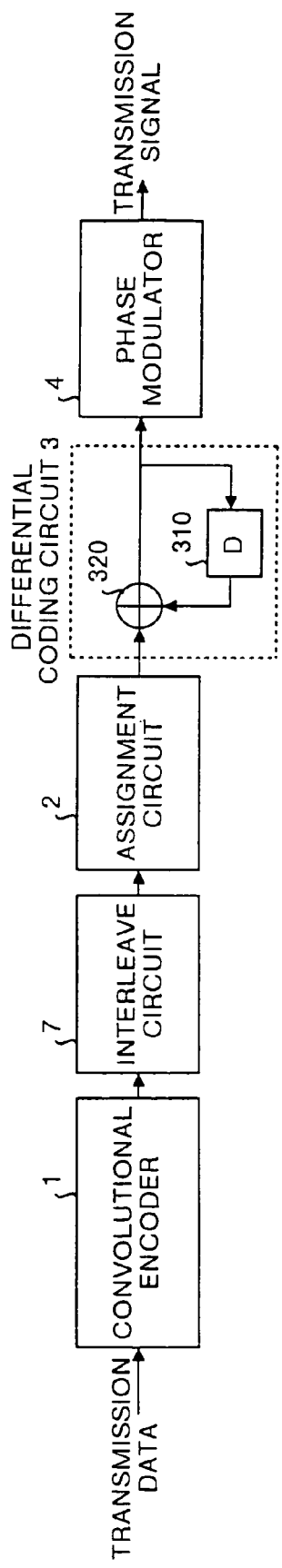
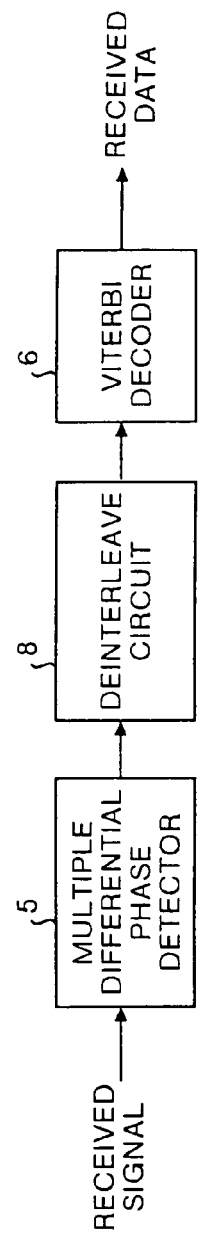
FIG.8A
FIG.8B

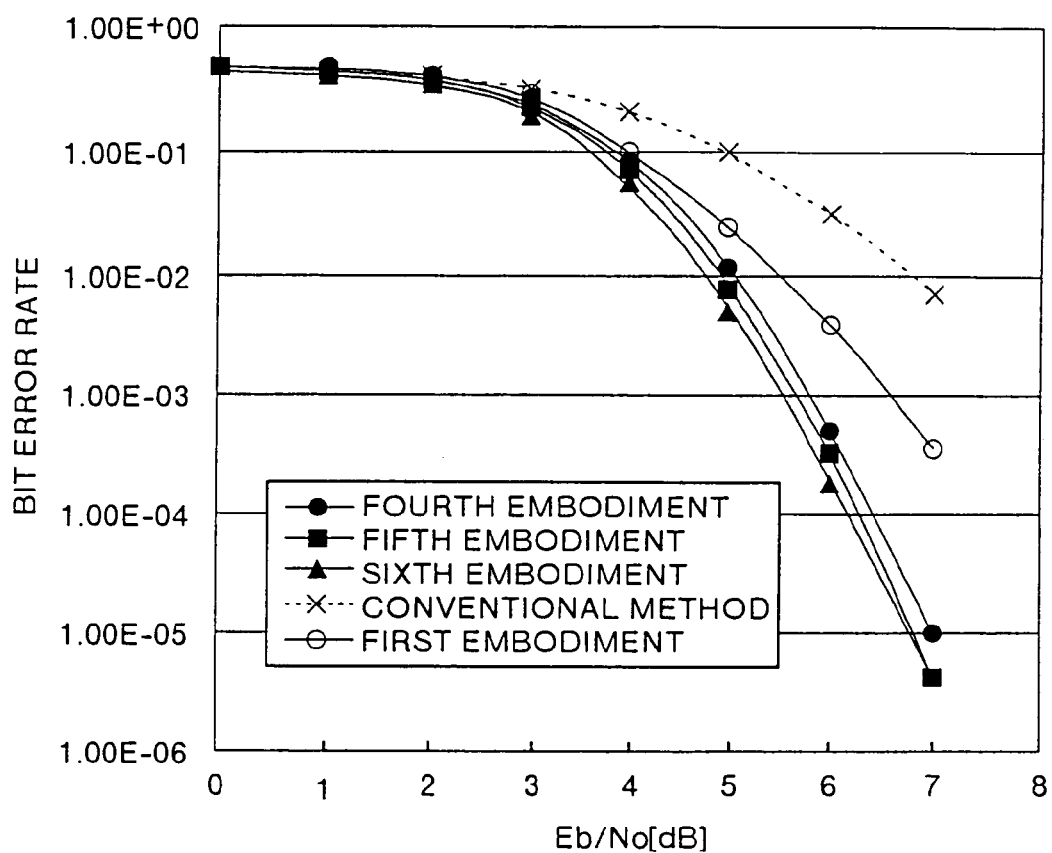

FIG.11

| $(P_i, Q_i)$ | $\Delta\theta = F(P_i, Q_i)$ |
|---|---|
| $(-1, -1)$ | 0 |
| $(-1, 1)$ | $\pi/2$ |
| $(1, 1)$ | $\pi$ |
| $(1, -1)$ | $3\pi/2$ |

DEMODULATOR, RECEIVER, AND COMMUNICATION SYSTEM

FIELD OF THE INVENTION

The present invention relates to a demodulator used for radio communication such as mobile communication and mobile satellite communication. More specifically, this invention relates to a demodulator using differential PSK (Phase Shift Keying) modulation and multiple differential phase detection. This invention also relates to a receiver and a communication system that make use of the demodulator of the present invention.

BACKGROUND OF THE INVENTION

First, a conventional demodulator will be explained. FIG. 10 is a diagram showing a structure of a prior demodulator (corresponding to a multiple differential phase detector 500) disclosed in "Differential Detection Scheme for DPSK using Phase Sequence Estimation" (Institute of Electronics, Information and Communication Engineers, Technical Report, RCS98-102, January, 1993).

The conventional demodulator comprises, a multiple differential phase detector 500 for generating/outputting demodulated data from a received signal, a 1 symbol differential phase detector 510, a multiple symbol differential phase detector 520, and a Viterbi sequence estimation unit 530. A receiver (not shown) that makes use of the multiple differential phase detector 500, a Viterbi decoder is provided which decodes demodulated data using Viterbi algorithm, and generates decoded data.

The 1 symbol differential phase detector 510 comprises following components. Namely, a delay element 511 stores the received signal of 1 symbol before, and a phase comparator 512 obtains a phase difference between a current received signal and the received signal of 1 symbol before and outputs a 1 symbol differential phase detected signal. The multiple symbol differential phase detector 520 comprises following components. Namely, delay elements 521-1, . . . , 521-(N−1) store past 1 symbol differential phase detected signals, and adders 522-1, . . . , 522-(N−1) obtain a sum of 1 symbol detected phases output from the delay elements 521-1, . . . , 521-(N−1).

Operation of a transmitter will be explained here in simple manner. In the transmitter, transmitted data $a_i \in \{-1, 1\}$ are subject to convolutional coding, and convolutional-coded data $d_i$ are output. For example, when the coding rate of the convolutional code is considered be 1/2, the convolutional-coded data can be represented by $[d_i=(P_i,Q_i):P_i,Q_i\in\{-1,1\}]$. The output convolutional-coded data $(P_i,Q_i)$ are converted into transmission differential phase $\Delta\theta_i=F(P_i,Q_i)$. For example, when differential QPSK (Quaternary Phase Shift Keying) modulation is adopted as the modulation method, the conversion rule F can be represented as shown in FIG. 11.

Then, transmission signal phase of 1 symbol before $\theta_i-1$ and the converted transmission differential phase $\Delta\theta_i$ are added according to the following recurrence equation (1) to generate the current transmission signal phase $\theta_i$, and this phase is then output.

$$\theta_i=\theta_{i-1}+\Delta\theta_i \quad (1)$$

Further, the phase is modulated according to the output transmission signal phase $\theta_i$, and a signal whose phase has been modulated is output as a transmission signal.

Operation of the receiver having the multiple differential phase detector 500 shown in FIG. 10 will now be explained. Received signal is input into the delay element 511 and the phase comparator 512 of the 1 symbol differential phase detector 510. The delay element 511 holds the received signal of 1 symbol before and inputs it into the phase comparator 512. The phase comparator 512 compares a phase of the current received signal and a phase of the received signal of 1 symbol before and obtains a phase difference of the signals and output a 1 symbol differential phase detected signal as the result of comparison.

When the phase of the received signal at time i is taken as $\phi_i$, the 1 symbol differential phase detection signal $\Delta \phi_{(1)i}$ output from the phase comparator 512 is represented by the following formula (2).

$$\Delta\psi_{(1)i}=\psi_i-\psi_{i-1} \quad (2)$$

That is, the 1 symbol differential phase detected signal $\Delta\phi_{(1)i}$ represents a difference in phase of the received signal for 1 symbol cycle, and when noise and fading do not occur, the value is equal to the transmitted differential phase $\Delta\theta_i$. Since the value of the transmitted differential phase $\Delta\theta_i$ is determined by transmitted data $a_i$ as mentioned above, transmitted data can be estimated by using the value of the 1 symbol differential phase detected signal $\Delta\phi_{(1)i}$.

The 1 symbol differential phase detected signal $\Delta\phi_{(1)i}$ output from the phase comparator 512 is input into the delay element 521-1 of the multiple symbol differential phase detector 520. The delay element 521-1 gives a delay of 1 symbol cycle of the received signal to the signal $\Delta\phi_{(1)i}$. The output of the delay element 521-1 is input into the adder 522-1. The 1 symbol differential phase detected signal $\Delta\phi_{(1)i}$ output from the phase comparator 512 is also input into the adder 522-1. That is, the adder 522-1 adds the 1 symbol differential phase detected signal $\Delta\phi_{(1)i}$ and the output $\Delta\phi_{(1)i-1}$ of the delay element 522-1.

Therefore, when the output (sum of a changing amount of delay) of the adder 522-1 is taken to be $\Delta\phi_{(2)i}$, then the formula (3) holds.

$$\Delta\psi_{(2)i}=\Delta\psi_{(1)i}+\Delta\psi_{(1)i-1}=\psi_i-\psi_{i-1}-\psi_{i-2}=\psi_i-\psi_{i-2} \quad (3)$$

That is, the output $\Delta\phi_{(2)i}$ of the adder 522-1 becomes a 2 symbol differential phase detected signal representing a difference amount of phase for 2 symbol periods of the received signal.

Total (N−1) units of delay elements 521-1, 521-2, . . . , 521-(N−1) are connected in parallel. The m-th (m=2, . . . , N−1) delay element delays the output of the (m−1)-th delay element by an amount which is equal to the 1 symbol period of the received signal before outputting. Therefore, the output of the m-th (m−1, 2, . . . , N−1) delay element will be $\Delta\phi_{(1)i-m}$.

Further, total (N−1) units of adders 522-1, 522-2, . . . , 522-(N−1) are connected in file. The output of the (m−1)th adder is input into the m-th (m−2, . . . , N−1) adder. Moreover, the outputs of the delay elements 521-1, 521-2, . . . 521-(N−1) are also input into the adders 522-1, 522-2, . . . , 522-(N−1). That is, the m-th (m−2, . . . , N−1) adder adds the output of the (m−1)th adder and the output of the m-th delay element and outputs the result.

Therefore, when the output of the m-th (m−2, . . . , N−1) adder at time i is taken to be $\Delta\phi_{(m+1)i}$, then the formula (4) holds.

$$\Delta\psi_{(m+1)i}=\Delta\psi_{(m)i}+\Delta\psi_{(1)i-m}=\Delta\psi_{(m)i}+(\psi_{i-m}-\psi_{i-m-1}) \quad (4)$$

Formula (4) is a recurrence formula about $\Delta\phi_{(m)i}$. When this formula is solved, the formula (5) is obtained.

$$\Delta\psi_{(m+1)i} = \Delta\psi_{(2)i} + \sum_{j=1}^{m}(\psi_{i-j} - \psi_{i-j-1}) \quad (5)$$

$$= \Delta\psi_{(2)i} + \psi_{i-2} - \psi_{i-m-1}$$

$$= (\psi_i - \psi_{i-2}) + \psi_{i-2} - \psi_{i-m-1}$$

$$= \psi_i - \psi_{i-(m+1)}$$

That is, the output value $\Delta\phi_{(m+1)i}$ of the m-th (m=2, ..., N−1) adder becomes a (m+1) symbol differential phase detected signal representing a difference of phase for (m+1) symbol period of the received signal. Thus, 2, 3, ..., N symbol differential phase detected signals are output from the total of (N−1) adders 522-1, 522-2, ..., 522-(N−1).

The multiple symbol differential phase detector 520 combines the total of (N−1) differential phase detection signals $\Delta\phi_{(2)i}, \ldots, \Delta\phi_{(N)i}$ and the 1 symbol differential phase detected signal $\Delta\phi_{(1)i}$ output from the phase comparator 512, and generates multiple differential phase detected signals $\Delta\phi_i = (\Delta\phi_{(1)i}, \Delta\phi_{(2)i}, \ldots, \Delta\phi_{(N)i})$. The number N of the multiple differential phase detected signals is referred to as a maximum delay symbol number.

The Viterbi sequence estimation unit 530 estimates a transmitted differential phase sequence according to known Viterbi algorithm using a trellis diagram representing state transitions composed of a combination of (N−1) transmission differential phase signal points. Precisely, for example, when M-PSK modulation is used on the transmission side, replicas of 1, 2, ..., N symbol differential phase detected signals are assumed for $M^N$ state transitions. Branch metric is calculated for all the state transitions on the trellis diagram based on the multiple differential phase detected signals $\Delta\phi_i = (\Delta\phi_{(1)i}, \Delta\phi_{(2)i}, \ldots, \Delta\phi_{(N)i})$.

Thereafter, the Viterbi sequence estimation unit 530 executes addition and comparison (ACS: Add-Compare-Select) based on the Viterbi algorithm, and selects survival path metrics for each state, and stores the selected paths into an internal path memory (not shown) and updates the path metrics. Hard decision is made for a bit corresponding to a path where the path metric finally becomes minimum/maximum, and demodulated data as the hard decision result are output from the differential phase detector 500.

A Viterbi decoder (not shown) on the receiver side decodes the demodulated data of the hard decision using the known Viterbi decoding method, and outputs the decoded data. Here, as the Viterbi decoding method, for example "Coding Theory" written by Imai Hideki, the Institute of Electronics, Information and Communication Engineers (1990) (in Japanese) may be used.

The conventional demodulator, namely, the multi differential phase detector outputs demodulated data obtained by the hard decision, and the Viterbi decoder of the receiver reproduces original transmitted data using the hard decided demodulated data.

However, in the conventional demodulator, since the multiple differential phase detector outputs the demodulated data according to the hard decision, namely, since an input into the Viterbi decoder is the hard decision value, a correcting capability of convolutional codes cannot be drawn out sufficiently as compared to the case where the input into the Viterbi decoder is a soft decision value.

SUMMARY OF THE INVENTION

It is an object of this invention to provide a demodulator which is capable of outputting soft decision data, and a receiver and a communication system having the demodulator which are capable of drawing out the correcting capability of the convolutional codes sufficiently and realizing a satisfactory bit error rate performance.

In order to solve the above problem and achieve the above object, a demodulator of the present invention comprises a multiple differential phase detected signal output unit for calculating phase differences between a received signal and received signals of 1, 2, ..., N (where N is an integer greater than 2) symbols before so as to output the calculated results as 1, 2, ..., N symbol differential phase detected signals; and a soft decision demodulated data estimating unit which estimates a transmitted differential phase sequence according to the 1, 2, ..., N symbol differential phase detected signals using a trellis diagram representing transitions of differential phase states of transmitted signals and Viterbi algorithm, and estimates soft decision demodulated data according to the estimated transmitted differential phase sequence and survival path metric that transit into each state on the trellis diagram.

Further, in the soft decision demodulated data estimating unit, a bit corresponding to the differential phase composing a state having minimum/maximum survival path metric on the trellis diagram is hard decision data, a difference between a survival path metric that transit into a state having minimum/maximum survival path metric and one that transit into another state which has minimum/maximum survival path metric in the states composed the differential phase corresponding to the bits obtained by inverting the hard decision data are used as components is reliability information of the hard decision data and the soft decision demodulated data are generated according to the hard decision data and the reliability information.

The demodulator according to next invention comprises a multiple differential phase detected signal output unit for calculating phase differences between a received signal and received signals of 1, 2, ..., N (where N is an integer greater than 2) symbols before so as to output the calculated results as 1, 2, ..., N symbol differential phase detected signals; a power detection unit for detecting a power of the received signal; and a soft decision demodulated data estimating unit which estimates transmitted differential phase sequence according to the 1, 2, ..., N symbol differential phase detected signals using a trellis diagram representing transitions of differential phase states of transmitted signals and Viterbi algorithm, and estimates soft decision demodulated data according to the estimated transmitted differential phase sequence, survival path metric that transit into each state on the trellis diagram and the power.

Further, in the soft decision demodulated data estimating unit, a bit corresponding to the differential phase composing a state having minimum/maximum survival path metric on the trellis diagram is hard decision data, a difference between a survival path metric that transit into a state having minimum/maximum survival path metric and one that transit into another state which has minimum/maximum survival path metric in the states composed the differential phase corresponding to the bits obtained by inverting the hard decision data are used as components is multiplied by power so that the multiplied result is reliability information of the hard decision data and the soft decision demodulated data are generated according to the hard decision data and the reliability information.

The demodulator according to next invention comprises a multiple differential phase detected signal output unit for calculating phase differences between a received signal and received signals of 1, 2, ..., N (where N is an integer greater than 2) symbols before so as to output the calculated results as 1, 2, . . . , N symbol differential phase detected signals; a power detection unit for detecting a power of the received signal; a ρ-multiplying unit for multiplying the power by ρ; and a soft decision demodulated data estimating unit which estimates transmitted differential phase sequence according to the 1, 2, . . . , N symbol differential phase detected signals using a trellis diagram representing transitions of differential phase states of transmitted signals and Viterbi algorithm, and estimates soft decision demodulated data according to the estimated transmitted differential phase sequence, survival path metric that transit into each state on the trellis diagram and the ρ-multiplied value of the power.

Further, in the soft decision demodulated data estimating unit, a bit corresponding to the differential phase composing a state having minimum/maximum survival path metric on the trellis diagram is hard decision data, a difference between a survival path metric that transit into a state having minimum/maximum survival path metric and the one that transit into another state which has minimum/maximum survival path metric in the states composed the differential phase corresponding to the bits obtained by inverting the hard decision data are used as components is multiplied by the ρ-multiplied value of the power so that the multiplied result is reliability information of the hard decision data, and the soft decision demodulated data are generated according to the hard decision data and the reliability information.

The receiver according to next invention comprises a multiple differential phase detected signal output unit for calculating phase differences between a received signal and received signals of 1, 2, . . . , N (where N is an integer greater than 2) symbols before so as to output the calculated results as 1, 2, . . . , N symbol differential phase detected signals; a soft decision demodulated data estimating unit which estimates a transmitted differential phase sequence according to the 1, 2, . . . , N symbol differential phase detected signals using a trellis diagram representing transitions of differential phase states of transmitted signals and Viterbi algorithm, and estimates soft decision demodulated data according to the estimated transmitted differential phase sequence and survival path metric that transit into each state on the trellis diagram and a decoding unit for decoding original transmitted data based on the soft decision demodulated data.

The receiver according to next invention comprises a multiple differential phase detected signal output unit for calculating phase differences between a received signal and received signals of 1, 2, . . . , N (where N is an integer greater than 2) symbols before so as to output the calculated results as 1, 2, . . . , N symbol differential phase detected signals; a soft decision demodulated data estimating unit which estimates a transmitted differential phase sequence according to the 1, 2, . . . , N symbol differential phase detected signals using a trellis diagram representing transitions of differential phase states of transmitted signals and Viterbi algorithm, and estimates soft decision demodulated data according to the estimated transmitted differential phase sequence and survival path metric that transit into each state on the trellis diagram; an interleaving unit for interleaving the soft decision demodulated data according to a predetermined algorithm; and a decoding unit for decoding original transmitted data based on the soft decision demodulated data after interleaving.

The receiver according to next invention comprises a multiple differential phase detected signal output unit for calculating phase differences between a received signal and received signals of 1, 2, . . . , N (where N is an integer greater than 2) symbols before so as to output the calculated results as 1, 2, . . . , N symbol differential phase detected signals; a power detection unit for detecting a power of the received signal; a soft decision demodulated data estimating unit which estimates transmitted differential phase sequence according to the 1, 2, . . . , N symbol differential phase detected signals using a trellis diagram representing transitions of differential phase states of transmitted signals and Viterbi algorithm, and estimates soft decision demodulated data according to the estimated transmitted differential phase sequence, survival path metric that transit into each state on the trellis diagram and the power and a decoding unit for decoding original transmitted data based on the soft decision demodulated data.

The receiver according to next invention comprises a multiple differential phase detected signal output unit for calculating phase differences between a received signal and received signals of 1, 2, . . . , N (where N is an integer greater than 2) symbols before so as to output the calculated results as 1, 2, . . . , N symbol differential phase detected signals; a power detection unit for detecting a power of the received signal; a soft decision demodulated data estimating unit which estimates transmitted differential phase sequence according to the 1, 2, . . . , N symbol differential phase detected signals using a trellis diagram representing transitions of differential phase states of transmitted signals and Viterbi algorithm, and estimates soft decision demodulated data according to the estimated transmitted differential phase sequence, survival path metric that transit into each state on the trellis diagram and the power; a unit for interleaving the soft decision demodulated data according to a predetermined algorithm and a decoding unit for decoding original transmitted data based on the soft decision demodulated data after interleaving.

The receiver according to next invention comprises a multiple differential phase detected signal output unit for calculating phase differences between a received signal and received signals of 1, 2, . . . , N (where N is an integer greater than 2) symbols before so as to output the calculated results as 1, 2, . . . , N symbol differential phase detected signals; a power detection unit for detecting a power of the received signal; a ρ-multiplying unit for multiplying the power by ρ; a soft decision demodulated data estimating unit which estimates transmitted differential phase sequence according to the 1, 2, . . . , N symbol differential phase detected signals using a trellis diagram representing transitions of differential phase states of transmitted signals and Viterbi algorithm, and estimates soft decision demodulated data according to the estimated transmitted differential phase sequence, survival path metric that transit into each state on the trellis diagram and the ρ-multiplied value of the power; and a decoding unit for decoding original transmitted data based on the soft decision demodulated data.

The receiver according to next invention comprises a multiple differential phase detected signal output unit for calculating phase differences between a received signal and received signals of 1, 2, . . . , N (where N is an integer greater than 2) symbols before so as to output the calculated results as 1, 2, . . . , N symbol differential phase detected signals; a power detection unit for detecting a power of the received signal; a ρ-multiplying unit for multiplying the power by ρ; a soft decision demodulated data estimating unit which estimates transmitted differential phase sequence according to the 1, 2, . . . , N symbol differential phase detected signals using a trellis diagram representing transitions of differential phase states of transmitted signals and Viterbi algorithm, and estimates soft decision demodulated data according to the estimated transmitted differential phase sequence, survival path metric that transit into each state on the trellis diagram and the ρ-multiplied value of the power; an interleaving unit for interleaving the soft decision demodulated data according to a predetermined algorithm; and a decoding unit for decoding original transmitted data based on the soft decision demodulated data after interleaving.

The communication system according to the next invention comprises a transmitter and a receiver, wherein the transmitter comprises a convolutional coding unit for convolutional-coding transmitted data; a converting unit for converting the convolutional-coded data into a transmission differential phase; a differential coding unit for differentially coding the transmission differential phase and maps the differential encoded data to the signal phases; and a transmission signal generation/output unit for generating/outputting a differential phase modulated signal based on the transmission signal phase, and the receiver comprises a multiple differential phase detected signal output unit for calculating phase differences between a received signal and received signals of 1, 2, . . . , N (where N is an integer greater than 2) symbols before so as to output the calculated results as 1, 2, . . . , N symbol differential phase detected signals; a soft decision demodulated data estimating unit which estimates a transmitted differential phase sequence according to the 1, 2, . . . , N symbol differential phase detected signals using a trellis diagram representing transitions of differential phase states of transmitted signals and Viterbi algorithm, and estimates soft decision demodulated data according to the estimated transmitted differential phase sequence and survival path metric that transit into each state on the trellis diagram and a decoding unit for decoding original transmitted data based on the soft decision demodulated data.

A communication system according to the next invention comprises a transmitter and a receiver, wherein the transmitter comprises a convolutional coding unit for convolutional-coding transmitted data; a first interleaving unit for interleaving an order of the convolutional-coded data according to a predetermined algorithm; a converting unit for converting the interleaved data into a transmission differential phase; a differential coding unit for differentially coding the transmission differential phase and maps the differential encoded data to the signal phases; and a transmission signal generation/output unit for generating/outputting a differential phase modulated signal based on the transmission signal phase, and the receiver comprises a multiple differential phase detected signal output unit for calculating phase differences between a received signal and received signals of 1, 2, . . . , N (where N is an integer greater than 2) symbols before so as to output the calculated results as 1, 2, . . . , N symbol differential phase detected signals; a soft decision demodulated data estimating unit which estimates a transmitted differential phase sequence according to the 1, 2, . . . , N symbol differential phase detected signals using a trellis diagram representing transitions of differential phase states of transmitted signals and Viterbi algorithm, and estimates soft decision demodulated data according to the estimated transmitted differential phase sequence and survival path metric that transit into each state on the trellis diagram a second interleaving unit for interleaving the soft decision demodulated data according to a predetermined algorithm; and a decoding unit for decoding original transmitted data based on the soft decision demodulated data after interleaving.

A communication system according to the next invention comprises a transmitter and a receiver, wherein the transmitter comprises a convolutional coding unit for convolutional-coding transmitted data; a converting unit for converting the convolutional-coded data into a transmission differential phase; a differential coding unit for differentially coding the transmission differential phase and maps the differential encoded data to the signal phases; and a transmission signal generation/output unit for generating/outputting a differential phase modulated signal based on the transmission signal phase, and the receiver comprises a multiple differential phase detected signal output unit for calculating phase differences between a received signal and received signals of 1, 2, . . . , N (where N is an integer greater than 2) symbols before so as to output the calculated results as 1, 2, . . . , N symbol differential phase detected signals; a soft decision demodulated data estimating unit which estimates transmitted differential phase sequence according to the 1, 2, . . . , N symbol differential phase detected signals using a trellis diagram representing transitions of differential phase states of transmitted signals and Viterbi algorithm, and estimates soft decision demodulated data according to the estimated transmitted differential phase sequence, survival path metric that transit into each state on the trellis diagram and the power; and a decoding unit for decoding original transmitted data based on the soft decision demodulated data.

A communication system according to the next invention comprises a transmitter and a receiver, wherein the transmitter comprises a convolutional coding unit for convolutional-coding transmitted data; a first interleaving unit for interleaving an order of the convolutional-coded data according to a predetermined algorithm; a converting unit for converting the interleaved data into a transmission differential phase; a differential coding unit for differentially coding the transmission differential phase and maps the differential encoded data to the signal phases; and a transmission signal generation/output unit for generating/outputting a differential phase modulated signal based on the transmission signal phase, and the receiver comprises a multiple differential phase detected signal output unit for calculating phase differences between a received signal and received signals of 1, 2, . . . , N (where N is an integer greater than 2) symbols before so as to output the calculated results as 1, 2, . . . , N symbol differential phase detected signals; a soft decision demodulated data estimating unit which estimates transmitted differential phase sequence according to the 1, 2, . . . , N symbol differential phase detected signals using a trellis diagram representing transitions of differential phase states of transmitted signals and Viterbi algorithm, and estimates soft decision demodulated data according to the estimated transmitted differential phase sequence, survival path metric that transit into each state on the trellis diagram and the power a second interleaving unit for interleaving the soft decision demodulated data according to a predetermined algorithm; and a decoding unit for decoding original transmitted data based on the soft decision demodulated data after interleaving.

A communication system according to the next invention comprises a transmitter and a receiver, wherein the transmitter comprises a convolutional coding unit for convolutional-coding transmitted data; a converting unit for converting the convolutional-coded data into a transmission differential phase; a differential coding unit for differentially coding the transmission differential phase and maps the differential encoded data to the signal phases; and a transmission signal generation/output unit for generating/outputting a differential phase modulated signal based on the transmission signal phase, and the receiver comprises a multiple differential phase detected signal output unit for calculating phase differences between a received signal and received signals of 1, 2, . . . , N (where N is an integer greater than 2) symbols before so as to output the calculated results as 1, 2, . . . , N symbol differential phase detected signals; a soft decision demodulated data estimating unit which estimates transmitted differential phase sequence according to the 1, 2, . . . , N symbol differential phase detected signals using a trellis diagram representing transitions of differential phase states of transmitted signals and Viterbi algorithm, and estimates soft decision demodulated data according to the estimated transmitted differential phase sequence, survival path metric that transit into each state on the trellis diagram and the ρ-multiplied value of the power; and a decoding unit for decoding original transmitted data based on the soft decision demodulated data.

A communication system according to the next invention comprises a transmitter and a receiver, wherein the transmitter comprises a convolutional coding unit for convolutional-coding transmitted data; a first interleaving unit for interleaving an order of the convolutional-coded data according to a predetermined algorithm; a converting unit for converting the interleaved data into a transmission differential phase; a differential coding unit for differentially coding the transmission differential phase and maps the differential encoded to the signal phases; and a transmission signal generation/output unit for generating/outputting a differential phase modulated signal based on the transmission signal phase, and the receiver comprises a multiple differential phase detected signal output unit for calculating phase differences between a received signal and received signals of 1, 2, . . . , N (where N is an integer greater than 2) symbols before so as to output the calculated results as 1, 2, . . . , N symbol differential phase detected signals; a soft decision demodulated data estimating unit which estimates transmitted differential phase sequence according to the 1, 2, . . . , N symbol differential phase detected signals using a trellis diagram representing transitions of differential phase states of transmitted signals and Viterbi algorithm, and estimates soft decision demodulated data according to the estimated transmitted differential phase sequence, survival path metric that transit into each state on the trellis diagram and the ρ-multiplied value of the power a second interleaving unit for interleaving the soft decision demodulated data according to a predetermined algorithm; and a decoding unit for decoding original transmitted data based on the soft decision demodulated data after interleaving.

Other objects and features of this invention will become apparent from the following description with reference to the accompanying drawings.

BRIEF DESCRIPTION OF THE DRAWINGS

FIG. 8A and FIG. 8B are diagrams showing a structure of a communication system according to the present invention.

FIG. 9 is a diagram showing a BER performance of an AWGN communication channel.

FIG. 11 is a diagram showing a conversion rule of differential QPSK modulation.

DESCRIPTION OF THE PREFERRED EMBODIMENTS

A demodulator, receiver and communication system according to preferred embodiments of the present invention will be explained below with reference to the attached drawings. However, this invention is not limited only to these embodiments.

Figure 1A:
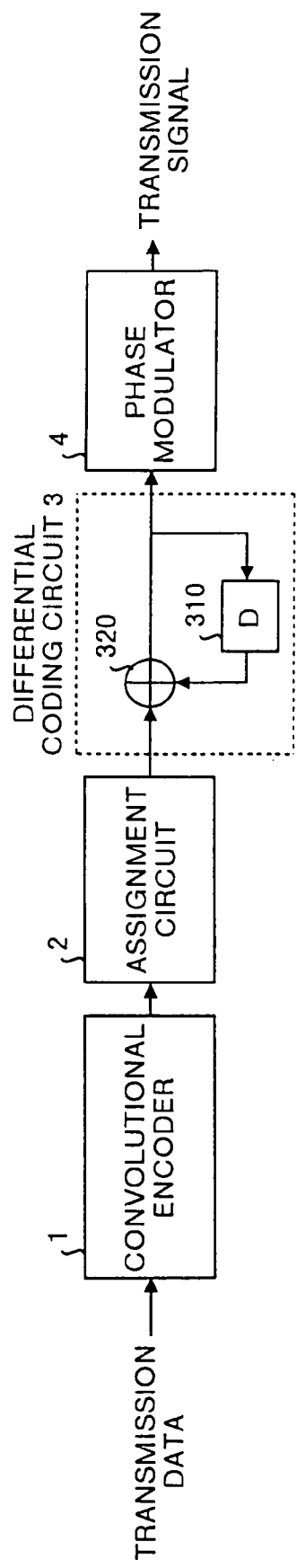
FIG. 1A and FIG. 1B are diagrams showing a structure of a communication system according to the present invention.
Figure 1B:
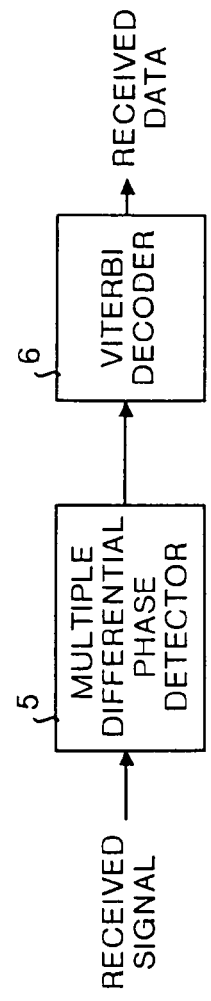

FIG. 1A and FIG. 1B are diagrams showing the structure of the communication system of the present invention. FIG. 1A shows the structure of a transmitter, and FIG. 1B shows the structure of a receiver in the communication system of the present invention. Here, a case where communication apparatuses having both the transmission and receiving structures transmit and receive data is assumed. Although a communication apparatus having both the transmitter and the receiver is assumed here, the communication apparatus may have only a transmitter or a receiver.

As shown in FIG. 1A, the transmitter comprises a convolutional encoder 1 for convolutional-coding transmitted data, an assignment circuit 2 for converting the convolutional-coded data output by the convolutional encoder 1 into transmission differential phase, a differential coding circuit 3 for differentially coding the transmission differential phase output by the assignment circuit 2 and outputting the coded result as a transmission signal phase, and a phase modulator 4 for modulating phase based on the transmission signal phase output from the differential coding circuit 3. The differential coding circuit 3 comprises a delay element 310, and an adder 320.

As shown in FIG. 1B, the receiver comprises a multiple differential phase detector 5 (corresponding to a multiple differential phase detector 5a in the present embodiment) for generating/outputting demodulated data from a received signal, and a Viterbi decoder 6 for decoding the demodulated data output from the multiple differential phase detector 5 based on the Viterbi decoding method and generating received data (original received data) as the decoded result.

Figure 2:
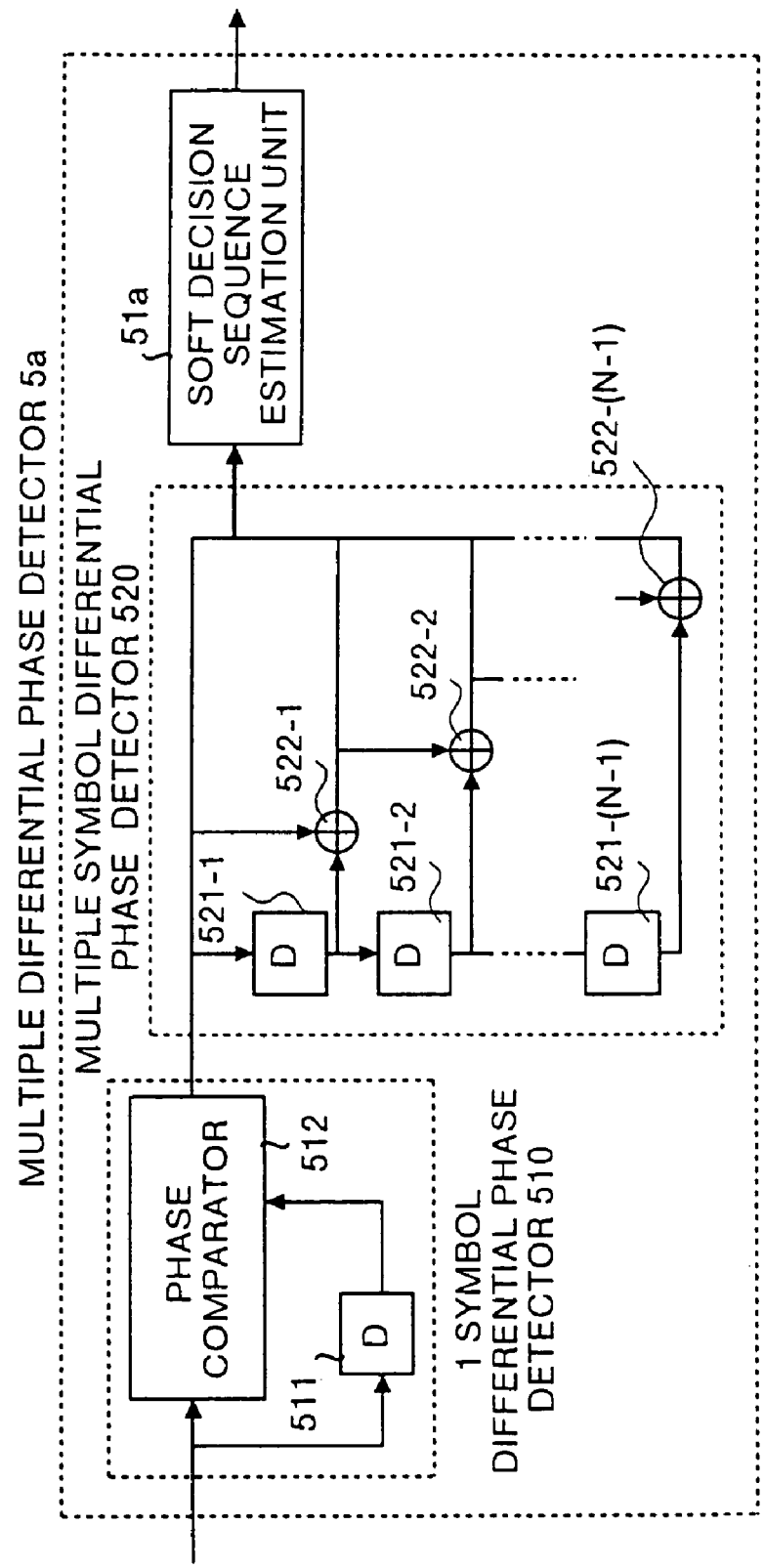
FIG. 2 is a diagram showing a structure of a multiple differential phase detector which operates as a demodulator in a first embodiment.

FIG. 2 is a diagram showing a structure of the multiple differential phase detector 5a which operates as a demodulator in the present embodiment. Same reference numerals have been provided to parts of the structure which are the same as those in the above-explained conventional demodulator, and the description thereof is omitted. The multiple differential phase detector comprises the 1 symbol differential phase detector 510, the multiple symbol differential phase detector 520, and a soft decision sequence estimation unit 51a.

Operation of the transmitter will now be explained. The convolutional encoder 1 convolutional codes transmitted data $a_i \in \{-1, 1\}$, and outputs convolutional-coded data $d_i$ as the coded result. For example, when the coding rate of the convolutional codes in the convolutional coder 1 is set to 1/2, the convolutional-coded data can be represented as $d_i = (P_i, Q_i) : P_i, Q_i \in \{-1, 1\}$.

The assignment circuit 2 converts the convolutional-coded data $d_i=(P_i,Q_i)$ into transmission differential phase $\Delta\phi_i=F(P_i,Q_i)$. Here, differential QPSK modulation is used as one example of the modulating method. The conversion rule F of the differential QPSK modulation can be similar to the conversion rule F shown in FIG. 11.

In the differential coding circuit 3, the adder 320 adds transmission signal phase $\theta_{i-1}$ of 1 symbol before output from the delay element 310 and the transmission differential phase $\Delta\theta_i$ output from the assignment circuit 2 according to the above-mentioned formula (1) to generate transmission signal phase $\theta_i$. This signal is then output.

The phase modulator 4 modulates the transmission signal based on the transmission signal phase $\theta_i$ received from the differential coding circuit 3 so as to output the signal whose phase has been modulated as a transmission signal.

Operation of the receiver will be explained next. The received signal is input into the delay element 511 and the phase comparator 512 of the multiple differential phase detector 5 as shown in FIG. 2. The delay element 511 which has received the signal outputs a received signal of 1 symbol before to the phase comparator 512. The phase comparator 512 compares the phase of the current received signal with the phase of the received signal of 1 symbol before, obtains a phase difference between the two signals, and outputs a 1 symbol differential phase detected signal as the result of comparison. For example, when a received signal phase at time i is taken to be $\phi_i$, a 1 symbol differential phase detected signal $\Delta\phi_{(1)i}$ output from the phase comparator 512 can be represented by the above-mentioned formula (2). Moreover, the 1 symbol differential phase detected signal $\Delta\phi_{(1)i}$ represents a difference of phase for 1 symbol period of the received signal, and when noise and fading do not occur, its value is equal to the transmitted differential phase $\Delta\theta_i$. Therefore, since the value of the transmission differential phase $\Delta\theta_i$ is determined by the transmitted data as mentioned above, transmitted data can be estimated by using the 1 symbol differential phase detected signal $\Delta\phi_{(1)i}$.

Thereafter, the 1 symbol differential phase detected signal $\Delta\phi_{(1)i}$ output from the phase comparator 512 is input into the delay element 521-1 of the multiple symbol differential phase detector 520. There, this signal is delayed by an amount which is equal to 1 symbol period of the received signal. The output of the delay element 521-1 is input into the adder 522-1. Moreover, the 1 symbol differential phase detected signal $\Delta\phi_{(1)i}$ output from the phase comparator 512 is also input into the adder 522-1. The adder 522-1 adds the 1 symbol differential phase detected signal $\Delta\phi_{(1)i}$ and the output $\Delta\phi_{(1)i-1}$ of the delay element 522-1 according to the above-mentioned formula (3). Namely, an output $\Delta\phi_{(2)i}$ of the adder 522-1 becomes a 2 symbol differential phase detected signal representing a difference of phase for 2 symbol periods of the received signal.

Total (N−1) units of delay elements 521-1, 521-2, . . . , 521-(N−1) are connected in parallel. The m-th (m=2, . . . , N−1) delay element delays an output of the (m−1)th delay element by an amount which is equal to 1 symbol period of the received signal, and outputs it. Therefore, the output of them-th (m=2, . . . , N−1) delay element at time i becomes $\Delta\phi_{(1)i-m}$.

Further, total (N−1) units of adders 252-1, 252-2, . . . , 252-(N−1) are connected in parallel. An output of the (m−1)th adder is input into the m-th (m=2, . . . , N−1) adder. Moreover, the outputs of the total of (N−1) delay elements 521-1, 521-2, . . . , 521-(N−1) are also input into the adders 522-1, 522-2, . . . , 522-(N−1) respectively. That is, the m-th (m=2, . . . , N−1) adder adds the output of the (m−1)th adder and the output of the m-th delay element, and outputs the result of addition. Therefore, when the output of the m-th (m=2, . . . , N−1) adder at time i is $\Delta\phi_{(m+1)i}$, the above-mentioned formulas (4) and (5) hold.

That is, an output value $\Delta\phi_{(m+1)i}$ of the m-th (m=2, . . . , N−1) adder becomes (m+1) symbol differential phase detected signal representing a difference of phase for (m+1) symbol periods of the received signal. 2, 3, . . . , N symbol differential phase detection signals are output from the total of (N−1) adders 522-1, 522-2, . . . , 522-(N−1).

The multiple symbol differential phase detector 520 combines the total of (N−1) differential phase detected signals $\Delta\phi_{(2)i}, \ldots, \Delta\phi_{(N)i}$ and the 1 symbol differential phase detected signal $\Delta\phi_{(1)i}$ output from the phase comparator 512 so as to generate multiple differential phase detected signals $\Delta\phi_i=(\Delta\phi_{(1)i}, \Delta\phi_{(2)i}, \ldots, \Delta\phi_{(N)i})$ as output signals.

The soft decision sequence estimation unit 51a estimates convolutional-coded data according to the Viterbi algorithm using a trellis diagram representing transitions of a phase state of a differential phase, and outputs the estimated result as soft decision demodulated data. A likelihood difference between the maximum likelihood sequence and a sequence which is obtained by inverting bit codes to be estimated in the maximum likelihood sequence is determined as "reliability of bit to be estimated", and a combination of (N−1) transmission differential phase signal points is "state".

More concretely, for example, when M-PSK modulation is used on the transmission side, the trellis diagram has $M^{N-1}$ states and the each states has M inflow and outflow branches. As a result, a total number of branches is $M^N$. Therefore, a total number of the state transitions is $M^N$. That is, a state transition from a state $B_{i-1}=(\beta_{i-(N-1)}, \beta_{i-(N-2)}, \ldots, \beta_{i-1})$ to a state $B_i$ ($\beta_{i-(N-2)}, \beta_{i-(N-3)}, \ldots, \beta_i$) means that a subsequence composed of continuous N elements of the transmission differential phase sequence $\{\Delta\theta_i\}$ is $\{\beta_{i-(N-1)}, \beta_{i-(N-2)}, \ldots \beta_i\}$. $\beta_{i-j}$ is one of the elements of the transmission differential phase $\Delta\theta_i$, and j=0, 1, . . . , N−1.

Therefore, the soft decision sequence estimation unit 51a can assume replicas of 1, 2, . . . , N symbol differential phase detected signals for the above-mentioned state transitions. That is, when a value of the replica of m-th (m=1, 2, . . . , N) symbol differential phase detected signal corresponding to the state transition is represented by $\Delta\theta_{(m)}\{\beta_{i-1}, \beta_i\}$, the formula (6) holds.

$$\Delta\theta_{(m)} = \{B_{i-1}, B_i\} \sum_{j=0}^{m-1} B_{i-j} \qquad (6)$$

In addition, branch metric is calculated for all the state transitions on the trellis diagram according to the multiple differential phase detected signals $\Delta\phi_i=(\Delta\phi_{(1)i}, \Delta\phi_{(2)i}, \ldots, \Delta\phi_{(N)i})$. That is, the branch metric of a branch corresponding to the sate transition from a state $B_{i-1}=(\beta_{i-(N-1)}, \beta_{i-(N-2)}, \ldots, \beta_{i-1})$ to a state $B_i=(\beta_{i-(N-2)}, \beta_{i-(N-3)}, \ldots, \beta_i)$ is obtained by a sum of absolute values of difference between 1, 2, . . . , N symbol differential phase detected signals $\Delta\phi_{(1)i}, \Delta\phi_{(2)i}, \ldots, \Delta\phi_{(N)i}$ and replicas of the 1, 2, . . . , N symbol differential phase detected signals $\Delta\theta_{(1)}\{\beta_{i-1}, \beta_i\}, \Delta\theta_{(2)}\{\beta_{i-1}, \beta_i\}, \ldots, \Delta\theta_{(N)}\{\beta_{i-1}, \beta_i\}$.

Therefore, in the soft decision sequence estimation unit 51a, when the branch metric of the branch corresponding to the state $B_{i-1}$ to the state $B_i$ is represented by $BM_i\{\beta_{i-1}, \beta_i\}$, the formula (7) holds.

$$BM_i\{B_{i-1}, B_i\} = \sum_{m=1}^{N} \Delta\psi_{(m)i} - \Delta\theta_{(m)}\{B_{i-1}, B_i\} \quad (7)$$

$$= \sum_{m=1}^{N} \Delta\psi_{(m)i} - \sum_{j=0}^{m-1} \Delta\phi_{i-j}$$

In such a manner, the soft decision sequence estimation unit 51a obtains an output of the multiple symbol differential phase detector 520 in the respective states at time i, namely, the branch metric according to the 1 to N symbol differential phase detected signals. ACS arithmetic is executed based on the Viterbi algorithm, and a survival path is selected for the respective states according to the arithmetic result, and the selected result is stored in an internal path memory (not shown) so that the path metric is updated.

Figure 3:
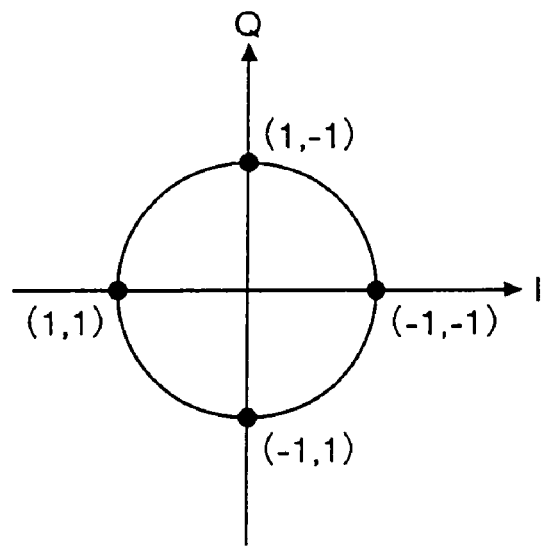
FIG. 3 is a diagram showing a differential phase which is assigned by using differential QPSK modulation.
Figure 4:
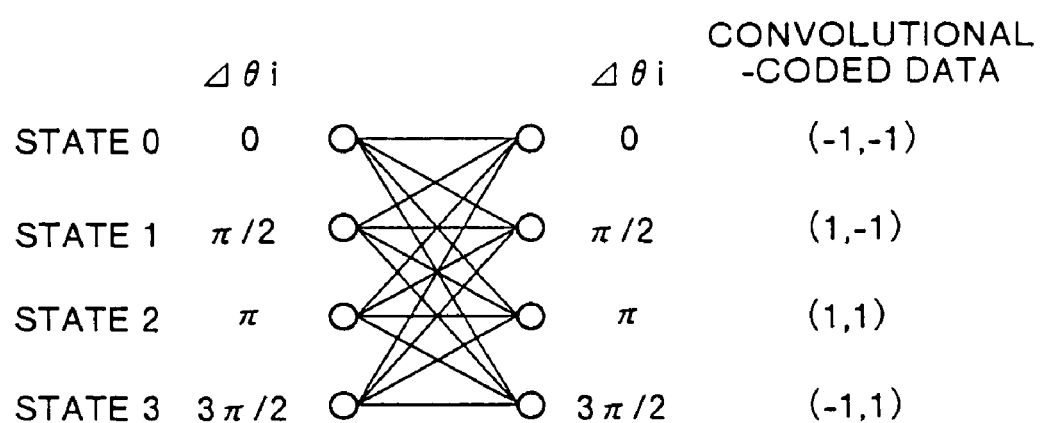
FIG. 4 is a trellis diagram in the case that differential QPSK modulation is used.

A method by which the soft decision sequence is obtained in the soft decision sequence estimation unit 51a will be explained below. As one example, differential phases are assigned by using the differential QPSK modulation as shown in FIG. 3, and the case where N=2 is assumed. FIG. 4 is a trellis diagram in correspondence to such a case.

A survival path is selected according to the above method at certain time i. At this time, in the trellis diagram shown in FIG. 4, convolutional-coded data are determined by a state into which the survival path at that time is brought. Moreover, convolutional-coded data on the transmission side corresponding to the four states 0, 1, 2 and 3 accord with the converting rule of the transmission differential phase (see FIG. 11), and become (−1,−1), (1,−1), (1,1) and (−1,1) respectively. As a result, high-likelihood path where the first bit of the convolutional-coded data at time i is −1 is a path where the path metric in the survival paths in the states 0 and 3 is smaller. Here, the path metric of this path is "likelihood where the first bit is −1". That is, when the path metrics of the survival paths in the states 0 and 3 are $PM_i(0)$ and $PM_i(3)$, "likelihood where the first bit is −1" becomes MIN ($PM_i(0)$ $PM_i(3)$).

Similarly, the high-likelihood path where the first bit is 1 is a path where path metric of the survival paths in the states 1 and 2 is smaller. Here, the path metric of this path is "likelihood where the first bit is 1". That is, when the path metrics of the survival paths in the states 1 and 2 are $PM_i(1)$ and $PM_i(2)$, "likelihood where the first bit is 1 " becomes MIN ($PM_i(1)$, $PM_i(2)$).

In this case, since the likelihood becomes higher with its value being smaller, as "likelihood where the first bit is −1" is smaller than "likelihood where the first bit is 1", "reliability that the first bit is −1" becomes higher. Therefore, the reliability $R_{1i(-1)}$ that the first bit is −1 is obtained by subtracting "likelihood that the first bit is −1" from "likelihood that the first bit is 1", and the reliability can be represented by the following formula (8).

$$R_{1i(-1)} = MIN(PM_i(1), PM_i(2)) - MIN(PM_i(0), PM_i(3)) \quad (8)$$

In addition, the reliability $R_{2i(-1)}$ that the second bit of the transmission bit at time i is −1 can be represented by the formula (9) similarly.

$$R_{2i(-1)} = MIN(PM_i(2), PM_i(3)) - MIN(PM_i(0), PM_i(1)) \quad (9)$$

As the last step when obtaining the soft decision sequence, as represented by the formula (10), the soft decision sequence estimation unit 51a multiplies the formulas (8) and (9) by −1 as a hard decision value respectively. Here, this multiplied results become soft decision demodulated data.

$$R_{1i} = -1 \times \{MIN(PM_i(1), PM_i(2)) - MIN(PM_i(0), PM_i(3))\}$$
$$= MIN(PM_i(0), PM_i(3)) - MIN(PM_i(1), PM_i(2)) \quad (10)$$

$$R_{2i} = -1 \times \{MIN(PM_i(2), PM_i(3)) - MIN(PM_i(0), PM_i(1))\}$$
$$= MIN(PM_i(0), PM_i(1)) - MIN(PM_i(2), PM_i(3))$$

After the soft decision sequence is estimated by the soft decision sequence estimation unit 51a in the multiple differential phase detector 5a, the Viterbi decoder 6 in the receiver (FIG. 1B) decodes the received soft decision demodulated data according to the Viterbi algorithm, and outputs the decoded result as received data (original transmitted data).

Figure 5:
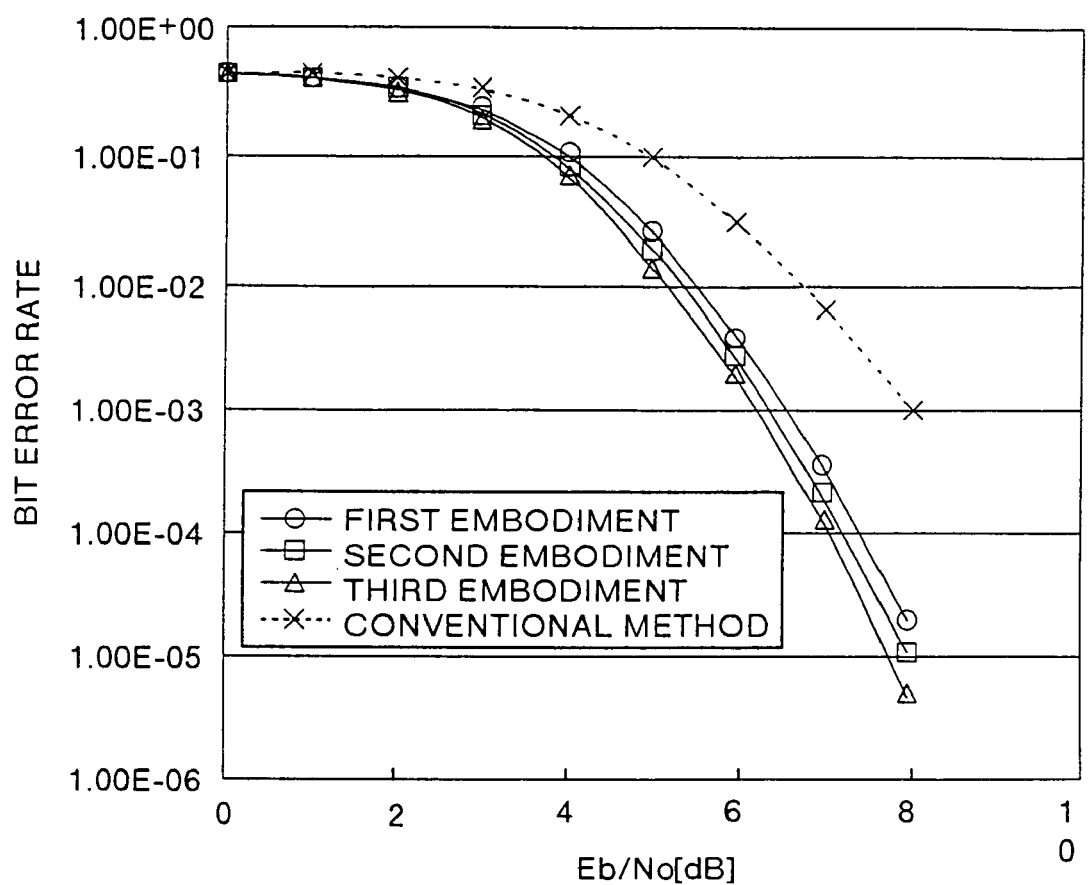
FIG. 5 is a diagram showing a BER performance of an AWGN communication channel.

FIG. 5 is a diagram showing BER (Bit Error Rate) performance of AWGN (Additive White Gaussian Noise) communication channel when the convolutional coding process where the coding rate is 1/2 and constraint length K is 7, and differential QPSK modulation are used, and N is 2. A comparison of the BER in the present embodiment and that in the prior method shows that the BER in the present embodiment is suppressed lower.

Thus, in the present embodiment, the output of the demodulator is a soft decision value, namely, the input into the Viterbi decoder 6 is a soft decision value. Therefore, the correcting capability can be improved more than the case where a hard decision value is input. Moreover, in the present embodiment, since only the phase information of the received signal is used for the demodulating process, the structure of the demodulator can be simplified.

For convenience of the explanation, differential QPSK modulation is adopted as one example of the modulating method. However, the present invention is not limited to this. That is, and BPSK demodulating method, 8 PSK modulating method or the like may alternatively be used. Moreover, it is assumed that the coding rate of the convolutional codes is 1/2. However, the present invention is not limited to this. That is, an arbitrary coding rate k/n (k and n are arbitrary real numbers) may alternatively be used. Further, the constraint length K was assumed to be 7. However, the present invention is not limited to this. Constraint length K may be 6, 8, 9 . . . Further, N was set to 2. However, the present invention is not limited to this. N may be set to 3, 4, . . . for example.

The first embodiment explained the demodulator (multiple differential phase detector 5a) which generated the soft decision demodulated data from the phase information of the received signal. However, there will be explained below the demodulator (multiple differential phase detector 5b in the present embodiment which generates soft decision demodulated data using phase information and detected power information. Since the structure of the communication system of the present invention is the same as that shown in FIG. 1A and FIG. 1B according to the first embodiment, the same reference numerals are given to it and the description thereof is omitted.

Figure 6:
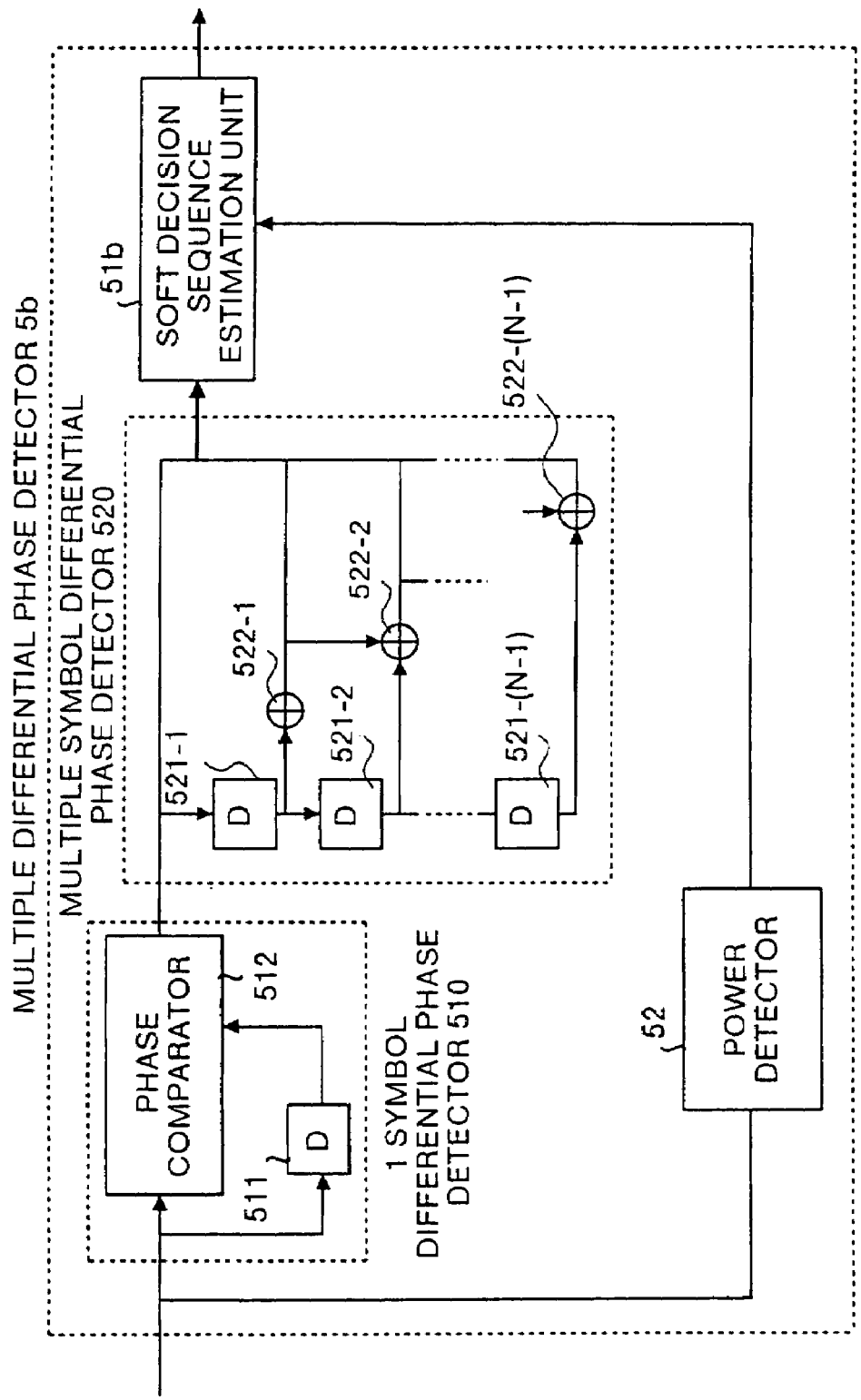
FIG. 6 is a diagram showing a structure of a multiple differential phase detector which operates as a demodulator in a second embodiment.

FIG. 6 is a diagram showing a structure of the multiple differential phase detector 5b which operates as a demodulator in the present embodiment. The same reference numerals are given to the parts of the structure which are the same as those of the multiple differential phase detector 5a (see FIG. 2) according to the first embodiment, and the description thereof is omitted. The multiple differential phase detector 5b comprises a soft decision sequence estimation unit 51b, and a power detector 52 for detecting the power of the received signal.

Operation of the receiver will be explained here. Since the operation of the transmitter, the functions of the 1 symbol differential phase detector 510 and multiple symbol differential phase detector 520 are same as explained in connection with the first embodiment, description thereof is omitted.

For example, the soft decision sequence estimation unit 51*b* estimates transmitted convolutional-coded data according to the Viterbi algorithm using the trellis diagram representing transitions of the phase states composed of a combination of (N−1) transmission differential phase signal points, and outputs the estimated result as the soft decision demodulated data. The convolutional-coded data are estimated based on multiple symbol differential phase detected signal output from the multiple symbol differential phase detector 520 and power of the received signal output from the power detector 52. In the process in the soft decision sequence estimation unit 51*b*, the processes from for storing survival paths and to for updating path metrics are the same as those in the first embodiment.

The method by which the soft decision sequence is obtained in the soft decision sequence estimation unit 51*b* will be explained next. A case in which a differential phase is assigned by executing the differential QPSK modulation and a number of the maximum delay symbols N is 2 is assumed. Moreover, the process for selecting survival paths in the each state on the trellis diagram so as to obtain likelihood corresponding to the every bit of the transmitted data is the same as that in the first embodiment.

A decision is made that "as the power of the received signal is greater, the likelihood is higher", and the likelihood calculated from the phase is multiplied by the power of the received signal as the output of the power detector 52 so that the soft decision demodulated data are obtained. More concretely, when N is equal to 2and differential QPSK modulation method is adopted, the soft decision demodulated data $R_{1i}$ and $R_{2i}$ of the transmitted data at time i can be represented as the following formula (11).

$$R_{1i}=P_i\{(-1)\times(\text{MIN}(PM_i(1),PM_i(2))-\text{MIN}(PM_i(0),PM_i(3)))\}=P_i\{\text{MIN}(PM_i(0),PM_i(3))-\text{MIN}(PM_i(1),PM_i(2))\} \quad (11)$$

$$R_{2i}=P_i\{(-1)\times(\text{MIN}(PM_i(2),PM_i(3))-\text{MIN}(PM_i(0),PM_i(1)))\}=P_i\{\text{MIN}(PM_i(0),PM_i(1))-\text{MIN}(PM_i(2),PM_i(3))\}$$

$P_i$ represents the power of the received signal, and $PM_i(0)$ to $PM_i(3)$ represent path metrics of survival paths in the states 0 to 3.

FIG. 5 shows the BER performance of an AWGN communication channel when the convolutional coding process and the differential QPSK modulation are used at the coding rate of 1/2 and the constraint length K of 7, and when a number of the maximum delay symbols N is 2. A comparison of BER according to the present embodiment and that according to the prior method shows that BER in the present embodiment is controlled lower. Further, comparison of BER according to the present embodiment and that according to the first embodiment shows that BER in the present embodiment is controlled lower. Accordingly, the performance in the present embodiment is improved. That is, the soft decision demodulated data with higher reliability can be obtained in the present embodiment.

Thus, the soft decision demodulated data are generated based on the phase of the received signal and the power, and the input into the Viterbi decoder 6 (see FIG. 1B) is determined as a soft decision value. As a result, the correcting capability can be further improved, and BER can be controlled low.

For convenience of the explanation, differential QPSK modulation is adopted as one example of the modulating method. However, the present invention is not limited to this. That is, BSPK modulating/demodulating method, 8 PSK modulating/demodulating method or the like may alternatively be used. Moreover, it was assumed that the convolutional coding rate is 1/2. However, the present invention is not limited to this. That is, an arbitrary coding rate k/n (k and n are arbitrary real numbers) may be used. Moreover, the constraint length K was assumed to be equal to 7. However, the present invention is not limited to this. That is, K may be 6, 8, 9, . . . , for example. Further, number N of the maximum delay symbols was assumed to be equal to 2. However, the present invention is not limited to this. That is, N may be 3, 4, . . . , for example.

The second embodiment explained the case that the demodulator (multiple differential phase detector 5*b*) generated the soft decision demodulated data based on the phase information of the received signal and the detected power information. However, the third embodiment explained below explains the case where a demodulator (multiple differential phase detector 5*c*) generates soft decision demodulated data based on the phase information and a value obtained by multiplying a detected power by ρ. Since the structure of the communication system of the present invention is the same as that shown in FIG. 1A and FIG. 1B in the first embodiment, the same reference numerals are given to it and the description thereof is omitted.

Figure 7:
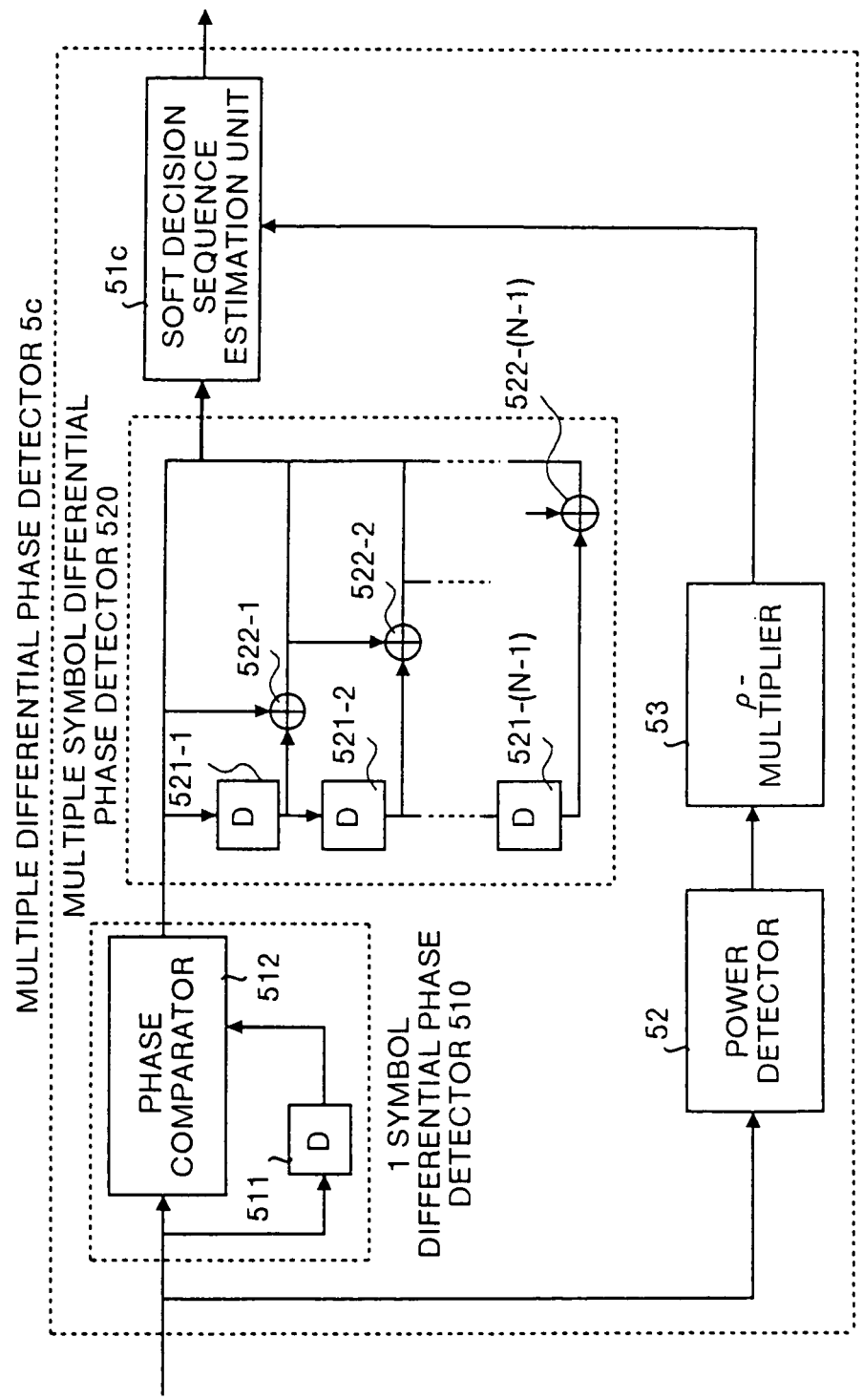
FIG. 7 is a diagram showing a structure of a multiple differential phase detector which operates as a demodulator in a third embodiment.
Figure 10:
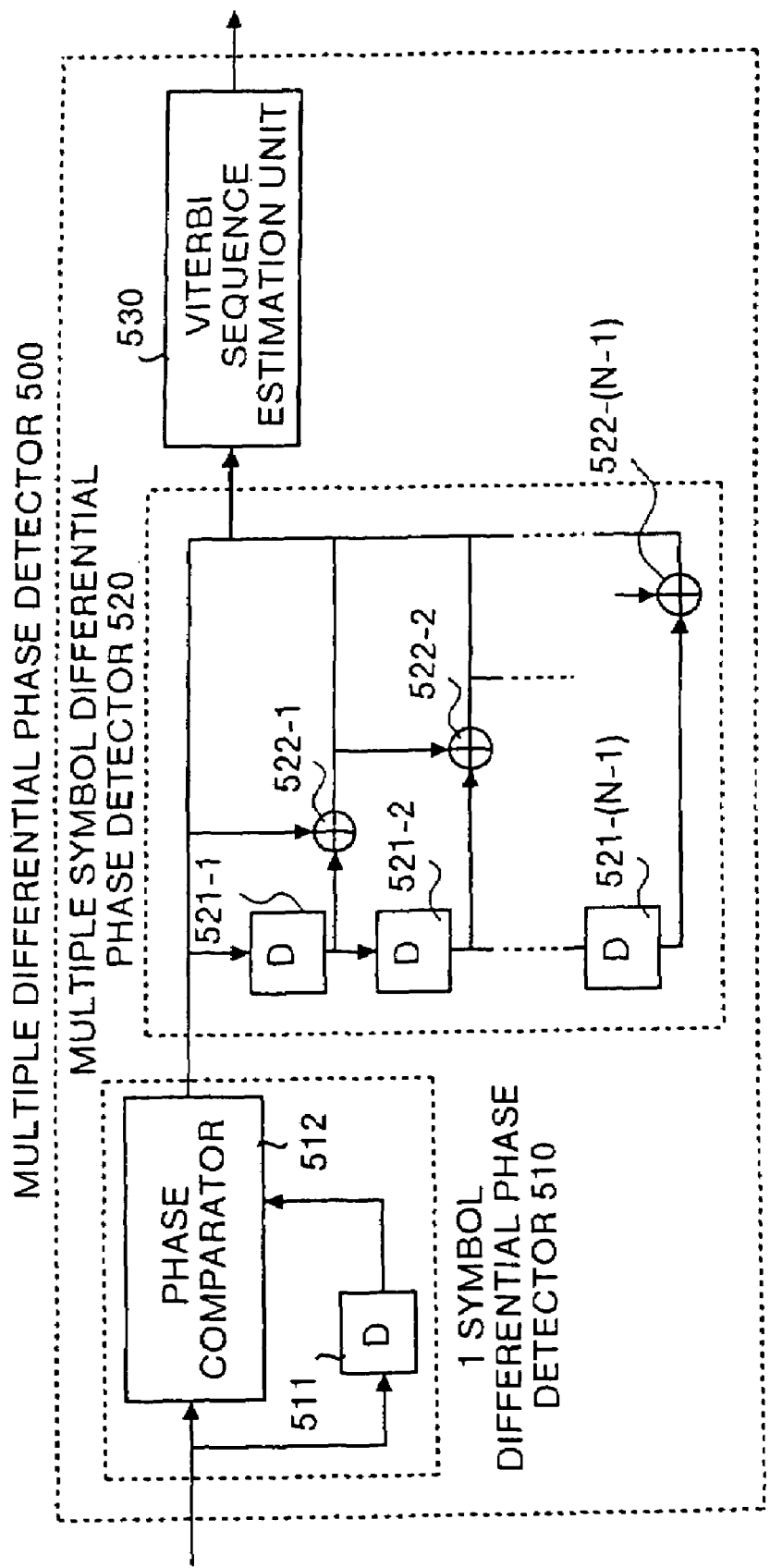
FIG. 10 is a diagram showing a conventional demodulator.

FIG. 7 is a diagram showing a structure of the multiple differential phase detector 5*c* which operates as a demodulator in the present embodiment. The same reference numerals are given to the structures which are the same as the multiple differential phase detector 5*a* (see FIG. 2) in the first embodiment and the multiple differential phase detector 5*c* (see FIG. 6) in the second embodiment, and the description thereof is omitted. The multiple differential phase detector 5*c* comprises a soft decision sequence estimation unit 51*c*, and a ρ-multiplier 53 for multiplying a power of a received signal output from the power detector 52 by ρ.

Operation of the receiver will be explained here. Since the operation of the transmitter, the functions of the 1 symbol differential phase detector 510, multiple symbol differential phase detector 520 and power detector 52 are the same as those in the first or second embodiment, the description thereof is omitted.

For example, the ρ-multiplier 53 multiples a power of a received signal output from the power detector 52 by ρ so as to output the calculated result. The soft decision sequence estimation unit 51*c* estimates transmitted convolutional-coded data according to the Viterbi algorithm using the trellis diagram showing transitions of phase states composed of combinations of (N−1) transmission differential phase signal points so as to output the estimated result as soft decision demodulated data. In the present embodiment, the convolutional-coded data are estimated according to a multiple symbol differential phase detect signal output from the multiple symbol differential phase detector 520 and ρ-multiplied value of the power of the received signal output from the ρ-multiplier 53. In the process in the soft decision sequence estimation unit 51*c*, the processes from for storing survival paths to for updating path metrics are the same as those in the first or second embodiment.

The method by which the soft decision sequence is obtained in the soft decision sequence estimation unit 51*c* will be explained next. In the present embodiment, as one example, the case that a differential phase is assigned by using the differential QPSK modulation and a number of the maximum delay symbols is N is 2 is assumed. Moreover, the process for selecting survival paths in the each state on the trellis diagram to obtain likelihood corresponding to the every bits of transmitted data is the same as that in the first or second embodiment.

A decision is made that "as ρ-multiplied value of the power of the received signal is larger, the likelihood is higher". For example, when the likelihood obtained from a phase is multiplied by the ρ-multiplied value of the power of the received signal as the output from the ρ-multiplier 53, soft decision demodulated data are obtained. More concretely, when N is equal to 2 and the differential QPSK modulation method is adopted, the soft decision demodulated data $R_{1i}$ and $R_{2i}$ of the transmitted data at time i can be represented as the formula (12).

$$R_{1i}=P_i^\rho\{(-1)\times(\text{MIN}(PM_i(1),PM_i(2))-\text{MIN}(PM_i(0),PM_i(3)))\}=P_i^\rho\{\text{MIN}(PM_i(0),PM_i(3))-\text{MIN}(PM_i(1)PM_i(2))\} \quad (12)$$

$$R_{2i}=P_i^\rho\{(-1)\times(\text{MIN}(PM_i(2),PM_i(3))-\text{MIN}(PM_i(0),PM_i(1)))\}=P_i^\rho\{\text{MIN}(PM_i(0),PM_i(1))-\text{MIN}(PM_i(2),PM_i(3))\}$$

Here, $P_i^\rho$ represents the power of the received signal, and $PM_i(0)$ to $PM_i(3)$ represent path metrics of the survival paths in the states 0 to 3.

FIG. 5 shows the BER performance of an AWGN communication channel when the convolutional coding and the differential QPSK modulation are used at the coding rate of 1/2 and the constraint length K of 7, and when a number of the maximum delay symbols N is 2 and ρ is 1/2. A comparison of BER according to the present embodiment according to the prior method shows that the BER in the present embodiment is controlled lower. Further, a comparison of BER according to the present embodiment and that according to the first or second embodiments shows that the BER in the present embodiment is controlled lower. Accordingly, the performance is further improved in the present embodiment. That is, the soft decision demodulated data with higher reliability can be obtained in the present embodiment.

Thus, the soft decision demodulated data are generated based on the phase of the received signal and the ρ-multiplied value of the power, and the input into the Viterbi decoder 6 (see FIG. 1B) is determined as a soft decision value. As a result, the correcting capability can be further improved, and BER can be controlled lower than that of the second embodiment.

For convenience of the explanation, differential QPSK modulation is adopted as one example of the modulating method. However, the present invention is not limited to this. That is, BPSK modulating/demodulating method, 8 PSK modulating/demodulating method or the like may alternatively be used. Moreover, it is assumed that the convolutional coding rate is equal to 1/2. However, the present invention is not limited to this. That is, an arbitrary coding rate k/n (k and n are arbitrary real numbers) may be used. Moreover, the constraint length K was assumed to be equal to 7. However, but the present invention is not limited to this. That is, K may be equal to 6, 8, 9, . . . , for example. Further, number N of the maximum delay symbols was assumed to be equal to 2. However, the present invention is not limited to this. That is, N may be equal to 3, 4, . . . , for example.

In the fourth embodiment, an interleaver for changing an order of data is added to the structure in the first embodiment shown in FIG. 1 so that the demodulation performance is improved. Here, in the structure of the communication system of the present invention, the same reference numerals are given to the parts of the structure similar to those in FIG. 1A and FIG. 1B of the first embodiment, and the description thereof is omitted.

FIG. 8A and 8B are diagrams showing the structure of the communication system of the present embodiment. FIG. 8A shows a structure of a transmitter, and FIG. 8B shows a structure of a receiver of the communication system of the present invention. Here, a case where communication apparatuses having both the transmitter and receiver for transmitting and receiving data is assumed. Although the communication apparatus having such a structures is assumed the invention is not limited to this. That is, the communication apparatus may comprise only the transmitter or only the receiver.

As shown in FIG. 8A, the transmitter comprises an interleave circuit 7. Further, as shown in FIG. 8B the receiver comprises a deinterleave circuit 8.

Operation of the transmitter will be explained here. The convolutional encoder 1 convolutional-codes transmitted data $a_i$ and outputs convolutional-coded data $d_i$. The interleave circuit 7 interleaves the convolutional-coded data $d_i$ according to a predetermined algorithm. The assignment circuit 2 converts the interleaved convolutional-coded data into transmission differential phase $\Delta\theta_i$. The differential coding circuit 3 adds a transmission signal phase $\theta_{i-1}$ of 1 symbol before output from the delay element 310 and the transmission differential phase $\Delta\theta_i$ as the output of the assignment circuit 2 according to the formula (1) so as to generate a transmission signal phase $\theta_i$ and output it. Finally, the phase modulator 4 modulates a phase according to the transmission signal phase $\theta_i$ received from the differential coding circuit 3 so as to output the signal whose phase has been modulated as a transmission signal.

Operation of the receiver will be explained next. A received signal is input into the 1 symbol differential phase detector 510 of the multiple differential phase detector 5a (see FIG. 2). The delay element 511 outputs the received signal to which time delay for 1 symbol is added, and the phase comparator 512 compares a current received signal with the received signal to which the time delay for 1 symbol has been added so as to obtain a phase difference, and outputs a 1 symbol differential phase detected signal as the compared result.

In the multiple symbol differential phase detector 520, the 1 symbol differential phase detected signal output from the 1 symbol differential phase detector 510 is stored in the delay elements 521-1, . . . , 521-(N−1). Moreover, the adders 522-1, . . . , 522-(N−1 adds m (1<m≦N) 1 symbol differential phase detected signals, and obtains m symbol differential phase detected signal which is a phase difference between m symbols of the received signal to output it.

The soft decision sequence estimation unit 51a estimates the transmitted convolutional-coded data according to the Viterbi algorithm using the trellis diagram representing transitions of the phase states of the differential phase so as to output the estimated result as soft decision demodulated data.

The deinterleave circuit 8 deinterleaves the soft decision demodulated data output from the soft decision sequence estimation unit 51a into a form before deinterleaving according to a predetermined algorithm so as to output the deinterleaves soft decision demodulated data. Finally, the Viterbi decoder 6 decodes the soft decision demodulated data deinterleaves by the deinterleave circuit 8 according to the Viterbi algorithm so as to output the decoded results as received data (original transmitted data).

FIG. 9 is a diagram showing a BER performance of an AWGN communication channel when the convolutional coding process and the differential QPSK modulation are used at the coding rate of 1/2 and the constraint length K of 7, and when a number of the maximum delay symbols N is 2. A comparison of BER according to the present embodiment and that according to the prior method shows that the BER in the present embodiment is controlled lower. Further, a comparison of BER according to the present embodiment and that according to the first embodiment shows that the BER performance in the present embodiment have further improved.

Thus, an interleaver circuit is provided in the transmitter, and a deinterleave circuit is provided in the receiver. As a result, the output of the demodulator is a soft decided value, namely, the input into the Viterbi decoder 6 is a soft decided value after deinterleaving. As a result, since the error correcting capability can be improved, BER can be controlled lower.

In the communication system (including multiple differential phase detector 5a) of the fourth embodiment, the soft decision demodulated data are generated from the phase information of the received signal, and the soft decision demodulated data after deinterleaving are decoded according to the Viterbi algorithm. However, in the communication system (including the multiple differential phase detector 5b) of the fifth embodiment, soft decision demodulated data are generated by using phase information and detected power information, and the soft decision demodulated data are subject to the deinterleaving process so as to be decoded according to the Viterbi algorithm.

Since the structure of the communication system of the present invention is the same as that shown in FIG. 8A and FIG. 8B in the fourth embodiment, the same reference numerals are given and the description thereof is omitted. Moreover, since an operation of the communication system of the present invention is the same as that described in the second or fourth embodiment, the description thereof is omitted. That is, the present embodiment is applied examples of the second and fourth embodiments.

FIG. 9 shows the BER performance of an AWGN communication channel when the convolutional coding and the differential QPSK modulation are used at the coding rate of 1/2 and the constraint length K of 7, and when a number of the maximum delay symbols N is 2. A comparison of the BER according to the present embodiment and that according to the prior method shows that the BER in the present embodiment is controlled lower. Further, a comparison of the BER according to the present embodiment and that according to the first to fourth embodiments show that the BER performance in the present embodiment have further improved.

Thus, an interleave circuit is provided in the transmitter, and an deinterleave circuit is provided in the receiver. Moreover, the soft decision demodulated data are generated according to the phase of the received signal and the power, and the input into the Viterbi decoder 6 (see FIG. 8B) is a soft decision value after deinterleaving. As a result, BER can be further controlled lower, and the error correcting capability can be improved greatly.

In the communication system (including multiple differential phase detector 5b) of the fifth embodiment, the soft decision demodulated data are generated from the phase information of the received signal and the detected power information, and the soft decision demodulated data after deinterleaving are decoded according to the Viterbi algorithm. However, in the communication system (including the multiple differential phase detector 5c) of the sixth embodiment, soft decision demodulated data are generated by using phase information and the $\rho$-multiplied value of the detected power, and the soft decision demodulated data are subject to the deinterleaving so as to be decoded according to the Viterbi algorithm.

Since the structure of the communication system of the present invention is the same as that shown in FIG. 8A and FIG. 8B in the fourth embodiment, the same reference numerals are given and the description thereof is omitted. Moreover, since the operation of the communication system of the present invention is the same as that described in the third, fourth or fifth embodiment, the description thereof is omitted. That is, the present embodiment is applied examples of the third, fourth and fifth embodiments.

FIG. 9 shows the BER performance of an AWGN communication channel when the convolutional coding and the differential QPSK modulation are used at the coding rate of 1/2 and the constraint length K of 7, and when a number of the maximum delay symbols N is 2 and $\rho$ is 1/2. A comparison of the BER according to the present embodiment and that according to the prior method shows that the BER in the present embodiment is controlled lower. Further, a comparison of the BER according to the present embodiment and that according to the first to fifth embodiments shows that the BER performance in the present embodiment have further improved.

Thus, an interleaver circuit is provided in the transmitter, and a deinterleave circuit is provided in the receiver. Moreover, the soft decision demodulated data are generated according to the phase of the received signal and the $\rho$-multiplied value of the power, and the input into the Viterbi decoder 6 (see FIG. 8B) is a soft decision value after deinterleaving. As a result, since the error correcting capability can be further improved, BER can be controlled lower.

As mentioned above, according to the present invention, the demodulator, in which the output is a soft decision value so that the error correcting capability can be improved more than the case that a hard decision value is output, can be obtained. Moreover, since only the phase information of a received signal is used in the demodulating process, the structure of the demodulator can be simplified.

Further, the output is a soft decision value so that BER can be controlled lower than that in the prior art, for example in the AWGN communication channel.

According to the next invention, the demodulator, in which the soft decision demodulated data are generated/ output based on the phase of a received signal and a power so that BER can be further improved and the error correcting capability can be improved greatly, can be obtained.

Further, the output is a soft decision value which is generated by using the phase of a received signal and a power so that BER can be controlled lower than that of the prior art, for example in the AWGN communication channel.

According to the next invention, since the soft decision demodulated data are generated/output based on the phase of a received signal and the $\rho$-multiplied value of a power so that the error correcting capability can be improved further, the demodulator which is capable of further suppressing BER can be obtained.

Further, the output is a soft decision value which is generated by using the phase of a received signal and the $\rho$-multiplied value of a power so that BER can be controlled lower than that of the prior art, for example in the AWGN communication channel.

According to the next invention, the input into decoding unit is a soft decision value so that the receiver, which is capable of improving the error correcting capability more than the case that a hard decision value is inputted, can be obtained.

According to the next invention, interleaving unit is provided and the input into the decoding unit is a soft decision value after interleaving so that the error correcting capability can be improved. As a result, the receiver which is capable of improving BER can be obtained.

According to the next invention, the soft decision demodulated data are generated according to the phase of a received signal and a power and the input into the decoding unit is a soft decision value so that the error correcting capability can be further improved. As a result, the receiver which is capable of improving BER can be obtained.

According to the next invention, the interleaving unit is provided and the soft decision demodulated data are generated according to the phase of a received signal and a power. Moreover, the input into the decoding unit is a soft decision value after interleaving so that the error correcting capability can be further improved. As a result, the receiver which is capable of reducing BER can be obtained.

According to the next invention, the soft decision demodulated data are generated according to the phase of a received signal and the ρ-multiplied value of a power and the input into the decoding unit is a soft decision value so that the error correcting capability can be further improved. As a result, the receiver which is capable of reducing BER can be obtained.

According to the next invention, the interleaving unit is provided and the soft decision demodulated data are generated according to the phase of a received signal and the ρ-multiplied value of the power. Moreover, the input into the decoding unit is a soft decision value after interleaving so that the error correcting capability can be further improved. As a result, the receiver which is capable of reducing BER can be obtained.

According to the next invention, the input into the decoding unit in the receiver is a soft decision value so that the communication system, which is capable of improving the error correcting capability more than the case that a hard decision value is input, can be obtained.

According to the next invention, first interleaving unit is provided in the transmitter and the second interleaving unit is provided in the receiver, and the input into the decoding unit is a soft decision value after interleaving. As a result, since the error correcting capability can be further improved, the communication system which is capable of reducing BER can be obtained.

According to the next invention, in the receiver, the soft decision demodulated data are generated based on the phase of a received signal and a power, and the input into the decoding unit is a soft decision value so that the error correcting capability can be further improved. As a result, the communication system which is capable of reducing BER can be obtained.

According to the next invention, the first interleaving unit is provided in the transmitter and the second interleaving unit is provided in the receiver, and the soft decision demodulated data are generated according to the phase of a received signal and the power. Moreover, the input into the decoding unit is a soft decision value after interleaving so that the error correcting capability can be further improved. As a result, the communication system which is capable of reducing BER can be obtained.

According to the next invention, in the receiver, the soft decision demodulated data are generated based on the phase of a received signal and the ρ-multiplied value of a power, and the input into the decoding unit is a soft decision value so that the error correcting capability can be further improved. As a result, the communication system which is capable of reducing BER can be obtained.

According to the next invention, the first interleaving unit is provided in the transmitter and the second interleaving unit is provided in the receiver, and the soft decision demodulated data are generated according to the phase of a received signal and the ρ-multiplied value of the power. Moreover, the input into the decoding unit is a soft decision value after interleaving so that the error correcting capability can be further improved. As a result, the communication system which is capable of reducing BER can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A demodulator, comprising:
   a multiple differential phase detected signal output unit configured to calculate phase differences between a received signal and previously received signals of 1, 2, . . . , N symbols (where N is an integer greater than 2) so as to output 1, 2, . . . , N symbol differential phase detected signals; and
   a soft decision demodulated data estimating unit configured to estimate a transmitted differential phase sequence according to the 1, 2, . . . , N symbol differential phase detected signals using a trellis diagram representing transitions of differential phase states of transmitted signals and a Viterbi algorithm, and to estimate soft decision demodulated data according to the estimated transmitted differential phase sequence and a survival path metric that transits into each state on the trellis diagram,
   wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state; and
   wherein, in said soft decision demodulated data estimating unit,
   a bit corresponding to the differential phase of a first state having a minimum survival path metric on the trellis diagram is the hard decision data, and
   the first survival path metric corresponds to the first survival path that transits into the first state having a minimum survival path metric, and the second survival path metric corresponds to the second survival path that transits into the second state having a minimum survival path metric.

2. A demodulator, comprising:
   a multiple differential phase detected signal output unit configured to calculate phase differences between a received signal and previously received signals of 1, 2, . . . , N symbols (where N is an integer greater than 2) so as to output 1, 2, . . . , N symbol differential phase detected signals;
   a power detection unit configured to detect power of the received signal; and a soft decision demodulated data estimating unit configured to estimate a transmitted differential phase sequence according to the 1, 2, . . . , N symbol differential phase detected signals using a trellis diagram representing transitions of differential phase states of transmitted signals and a Viterbi algorithm, and to estimate soft decision demodulated data according to the estimated transmitted differential phase sequence, a survival path metric that transits into each state on the trellis diagram, and the detected power, wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state; and wherein, in said soft decision demodulated data estimating unit, a bit corresponding to the differential phase of a first state having a minimum survival path metric on the trellis diagram is the hard decision data, and the first survival path metric corresponds to the first survival path that transits into the first state having a minimum survival path metric, and the second survival path metric corresponds to the second survival path that transits into the second state having a minimum survival path metric, wherein the reliability information is further multiplied by the detected power.

3. A demodulator, comprising:

a multiple differential phase detected signal output unit configured to calculate phase differences between a received signal and previously received signals of 1, 2, . . . , N symbols (where N is an integer greater than 2) so as to output 1, 2, . . . , N symbol differential phase detected signals;

a power detection unit configured to detect power of the received signal;

a $\rho$-multiplying unit configured to multiply the detected power by a predetermined number $\rho$; and a soft decision demodulated data estimating unit configured to estimate transmitted differential phase sequence according to the 1, 2, . . . , N symbol differential phase detected signals using a trellis diagram representing transitions of differential phase states of transmitted signals and a Viterbi algorithm, and to estimate soft decision demodulated data according to the estimated transmitted differential phase sequence, a survival path metric that transits into each state on the trellis diagram, and the $\rho$-multiplied value of the detected power, wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state; and wherein, in said soft decision demodulated data estimating unit, a bit corresponding to the differential phase of a first state having a minimum survival path metric on the trellis diagram is the hard decision data, and the first survival path metric corresponds to the first survival path that transits into the first state having a minimum survival path metric, and the second survival path metric corresponds to the second survival path that transits into the second state having a minimum survival path metric, wherein the reliability information is further multiplied by a $\rho$-multiplied value of the detected power.

4. A receiver that receives data from a transmitter, said receiver comprising:

a multiple differential phase detected signal output unit configured to calculate phase differences between a received signal and previously received signals of 1, 2, . . . , N symbols (where N is an integer greater than 2) so as to output 1, 2, . . . , N symbol differential phase detected signals;

a soft decision demodulated data estimating unit configured to estimate a transmitted differential phase sequence according to the 1, 2, . . . , N symbol differential phase detected signals using a trellis diagram representing transitions of differential phase states of transmitted signals and a Viterbi algorithm, and to estimate soft decision demodulated data according to the estimated transmitted differential phase sequence and a survival path metric that transits into each state on the trellis diagram, wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state; and a decoding unit configured to decode the original transmitted data based on the soft decision demodulated data; and wherein, in said soft decision demodulated data estimating unit, a bit corresponding to the differential phase of a first state having a minimum survival path metric on the trellis diagram is the hard decision data, and the first survival path metric corresponds to the first survival path that transits into the first state having a minimum survival path metric, and the second survival path metric corresponds to the second survival path that transits into the second state having a minimum survival path metric.

5. A receiver that receives data from a transmitter, said receiver comprising:

a multiple differential phase detected signal output unit configured to calculate phase differences between a received signal and previously received signals of 1, 2, . . . , N symbols (where N is an integer greater than 2) so as to output the calculated results as 1, 2, . . . , N symbol differential phase detected signals;

a soft decision demodulated data estimating unit configured to estimate a transmitted differential phase sequence according to the 1, 2, . . . , N symbol differential phase detected signals using a trellis diagram representing transitions of differential phase states of transmitted signals and a Viterbi algorithm, and to estimate soft decision demodulated data according to the estimated transmitted differential phase sequence and a survival path metric that transits into each state on the trellis diagram, the soft decision demodulated data being estimated as the product of hard decision data and reliability information, and the reliability information being calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state;

a deinterleaving unit configured to deinterleave the soft decision demodulated data according to a predetermined algorithm; and a decoding unit configured to decode the original transmitted data based on the soft decision demodulated data after the deinterleaving; and wherein, in said soft decision demodulated data estimating unit, a bit corresponding to the differential phase of a first state having a minimum survival path metric on the trellis diagram is the hard decision data, and the first survival path metric corresponds to the first survival path that transits into the first state having a minimum survival path metric, and the second survival path metric corresponds to the second survival path that transits into the second state having a minimum survival path metric.

6. A receiver that receives data from a transmitter, said receiver comprising:

a multiple differential phase detected signal output unit configured to calculate phase differences between a received signal and previously received signals of 1, 2, . . . , N (where N is an integer greater than 2) so as to output 1, 2, . . . , N symbol differential phase detected signals;

a power detection unit configured to detect power of the received signal;

a soft decision demodulated data estimating unit configured to estimate a transmitted differential phase sequence according to the 1, 2, . . . , N symbol differential phase detected signals using a trellis diagram representing transitions of differential phase states of transmitted signals and a Viterbi algorithm, and to estimate soft decision demodulated data according to the estimated transmitted differential phase sequence, a survival path metric that transits into each state on the trellis diagram, and the detected power, wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state; and a decoding unit configured to decode the original transmitted data based on the soft decision demodulated state; and wherein, in said soft decision demodulated data estimating unit, a bit corresponding to the differential phase of a first state having a minimum survival path metric on the trellis diagram is the hard decision data, and the first survival path metric corresponds to the first survival path that transits into the first state having a minimum survival path metric, and the second survival path metric corresponds to the second survival path that transits into the second state having a minimum survival path metric, wherein the reliability information is further multiplied by the detected power.

7. A receiver that receives data from a transmitter, said receiver comprising:

a multiple differential phase detected signal output unit configured to calculate phase differences between a received signal and previously received signals of 1, 2, . . . , N symbols (where N is an integer greater than 2) so as to output 1, 2, . . . , N symbol differential phase detected signals;

a power detection unit configured to detect power of the received signal;

a soft decision demodulated data estimating unit configured to estimate a transmitted differential phase sequence according to the 1, 2, . . . , N symbol differential phase detected signals using a trellis diagram representing transitions of differential phase states of transmitted signals and a Viterbi algorithm, and to estimate soft decision demodulated data according to the estimated transmitted differential phase sequence, a survival path metric that transits into each state on the trellis diagram, and the detected power, wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state;

a deinterleaving unit configured to deinterleave the soft decision demodulated data according to a predetermined algorithm; and a decoding unit configured to decode the original transmitted data based on the soft decision demodulated data after the deinterleaving; and wherein, in said soft decision demodulated data estimating unit, a bit corresponding to the differential phase of a first state having a minimum survival path metric on the trellis diagram is the hard decision data, and the first survival path metric corresponds to the first survival path that transits into the first state having a minimum survival path metric, and the second survival path metric corresponds to the second survival path that transits into the second state having a minimum survival path metric, wherein the reliability information is further multiplied by the detected power.

8. A receiver that receives data from a transmitter, said receiver comprising:

a multiple differential phase detected signal output unit configured to calculate phase differences between a received signal and previously received signals of 1, 2, . . . , N symbols (where N is an integer greater than 2) 50 as to output 1, 2, . . . , N symbol differential phase detected signals;

a power detection unit configured to detect power of the received signal;

a ρ-multiplying unit configured to multiply the detected power by a predetermined number ρ;

a soft decision demodulated data estimating unit configured to estimate a transmitted differential phase sequence according to the 1, 2, . . . , N symbol differential phase detected signals using a trellis diagram representing transitions of differential phase states of transmitted signals and a Viterbi algorithm, and to estimate soft decision demodulated data according to the estimated transmitted differential phase sequence, a survival path metric that transits into each state on the trellis diagram, and the ρ-multiplied value of the detected power, wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state; and a decoding unit configured to decode the original transmitted data based on the soft decision demodulated date; and wherein, in said soft decision demodulated data estimating unit, a bit corresponding to the differential phase of a first state having a minimum survival path metric on the trellis diagram is the hard decision data, and the first survival path metric corresponds to the first survival path that transits into the first state having a minimum survival path metric, and the second survival path metric corresponds to the second survival path that transits into the second state having a minimum survival path metric, wherein the reliability information is further multiplied by a ρ-multiplied value of the detected power.

9. A receiver that receives data from a transmitter, said receiver comprising:

a multiple differential phase detected signal output unit configured to calculate phase differences between a received signal and previously received signals of 1, 2, . . . , N symbols (where N is an integer greater than 2) so as to output 1, 2, . . . , N symbol differential phase detected signals;

a power detection unit configured to detect a power of the received signal;

a ρ-multiplying unit configured to multiply the detected power by a predetermined number ρ;

a soft decision demodulated data estimating unit configured to estimate a transmitted differential phase sequence according to the 1, 2, . . . , N symbol differential phase detected signals using a trellis diagram representing transitions of differential phase states of transmitted signals and a Viterbi algorithm, and to estimate soft decision demodulated data according to the estimated transmitted differential phase sequence, a survival path metric that transits into each state on the trellis diagram, and the ρ-multiplied value of the detected power, wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state;

a deinterleaving unit configured to deinterleave the soft decision demodulated data according to a predetermined algorithm; and a decoding unit configured to decode the original transmitted data based on the soft decision demodulated data after the deinterleaving; and wherein, in said soft decision demodulated data estimating unit, a bit corresponding to the differential phase of a first state having a minimum survival path metric on the trellis diagram is the hard decision data, and the first survival path metric corresponds to the first survival path that transits into the first state having a minimum survival path metric, and the second survival path metric corresponds to the second survival path that transits into the second state having a minimum survival path metric, wherein the reliability information is further multiplied by a ρ-multiplied value of the detected power.

10. A communication system comprising a transmitter for transmitting a data and a receiver for receiving the data, wherein said transmitter comprises:

a convolutional coding unit configured to convolutionally encode the transmitted data;

a converting unit configured to convert the convolutionally-encoded data into a transmission differential phase;

a differential coding unit configured to differentially encode the transmission differential phase and to map the differentially encoded data to the signal phases; and a transmission signal generation/output unit configured to generate/output a differential phase modulated signal based on the transmission signal phase, said receiver comprises:

a multiple differential phase detection signal output unit configured to calculate phase differences between a received signal and previously received signals of 1, 2, . . . , N symbols (where N is an integer greater than 2) 50 as to output 1, 2, . . . , N symbol differential phase detected signals;

a soft decision demodulated data estimating unit configured to estimate a transmitted differential phase sequence according to the 1, 2, . . . , N symbol differential phase detected signals using a trellis diagram representing transitions of differential phase states of transmitted signals and a Viterbi algorithm, and to estimate soft decision demodulated data according to the estimated transmitted differential phase sequence and a survival path metric that transits into each state on the trellis diagram, wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state; and a decoding unit configured to decode the original transmitted data based on the soft decision demodulated data; and wherein, in said soft decision demodulated data estimating unit, a bit corresponding to the differential phase of a first state having a minimum survival path metric on the trellis diagram is the hard decision data, and the first survival path metric corresponds to the firs survival path that transits into the first state having a minimum survival path metric, and the second survival path metric corresponds to the second survival path that transits into the second state having a minimum survival path metric.

11. A communication system comprising a transmitter for transmitting a data and a receiver for receiving the data, wherein said transmitter comprises:

a convolutional coding unit configured to convolutionally encode the transmitted data;

an interleaving unit configured to interleave an order of the convolutionally-encoded data according to a predetermined algorithm;

a converting unit configured to convert the interleaved data into a transmission differential phase;

a differential coding unit configured to differentially encode the transmission differential phase and to map the differentially encoded data to the signal phases; and a transmission signal generation/output unit configured to generate/output a differential phase modulated signal based on the transmission signal phase, said receiver comprises:

a multiple differential phase detected signal output unit configured to calculate phase differences between a received signal and previously received signals of 1, 2, . . . , N symbols (where N is an integer greater than 2) so as to output 1, 2, . . . , N symbol differential phase detected signals;

a soft decision demodulated data estimating unit configured to estimate a transmitted differential phase sequence according to the 1, 2, . . . , N symbol differential phase detected signals using a trellis diagram representing transitions of differential phase states of transmitted signals and a Viterbi algorithm, and to estimate soft decision demodulated data according to the estimated transmitted differential phase sequence and a survival path metric that transits into each state on the trellis diagram, wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state;

a deinterleaving unit configured to deinterleave the soft decision demodulated data according to the predetermined algorithm; and a decoding unit configured to decode the original transmitted data based on the soft decision demodulated data after the deinterleaving; and wherein, in said soft decision demodulated data estimating unit, a bit corresponding to the differential phase of a first state having a minimum survival path metric on the trellis diagram is the hard decision data, and the first survival path metric corresponds to the first survival path that transits into the first state having a minimum survival path metric, and the second survival path metric corresponds to the second survival path that transits into the second state having a minimum survival path metric.

12. A communication system comprising a transmitter for transmitting a data and a receiver for receiving the data, wherein said transmitter comprises:

a convolutional coding unit configured to convolutionally encode the transmitted data;

a converting unit configured to convert the convolutionally-encoded data into a transmission differential phase;

a differential coding unit configured to differentially encode the transmission differential phase and to map the differentially encoded data to the signal phases; and a transmission signal generation/output unit configured to generate/output a differential phase modulated signal based on the transmission signal phase, said receiver comprises:

a multiple differential phase detected signal output unit configured to calculate phase differences between a received signal and previously received signals of 1, 2, . . . , N symbols (where N is an integer greater than 2) so as to output 1, 2, . . . , N symbol differential phase detected signals;

a power detection unit configured to detect power of the received signal;

a soft decision demodulated data estimating unit configured to estimate transmitted differential phase sequence according to the 1, 2, . . . , N symbol differential phase detected signals using a trellis diagram representing transitions of differential phase states of transmitted signals and a Viterbi algorithm, and to estimate soft decision demodulated data according to the estimated transmitted differential phase sequence, a survival path metric that transits into each state on the trellis diagram, and the detected power, wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state; and a decoding unit configured to decode the original transmitted data based on the soft decision demodulated data; and wherein, in said soft decision demodulated data estimating unit, a bit corresponding to the differential phase of a first state having a minimum survival path metric on the trellis diagram is the hard decision data, and the first survival path metric corresponds to the first survival path that transits into the first state having a minimum survival path metric, and the second survival path metric corresponds to the second survival path that transits into the second state having a minimum survival path metric, wherein the reliability information is further multiplied by the detected power.

13. A communication system comprising a transmitter for transmitting a data and a receiver for receiving the data, wherein said transmitter comprises:

a convolutional coding unit configured to convolutionally encode the transmitted data;

an interleaving unit configured to interleave an order of the convolutionally-encoded data according to a predetermined algorithm;

a converting unit configured to convert the interleaved data into a transmission differential phase;

a differential coding unit configured to differentially encode the transmission differential phase and to map the differentially encoded data to the signal phases; and a transmission signal generation/output unit configured to generate/output a differential phase modulated signal based on the transmission signal phase, said receiver comprises:

a multiple differential phase detected signal output unit configured to calculate phase differences between a received signal and previously received signals of 1, 2, . . . , N symbols (where N is an integer greater than 2) so as to output 1, 2, . . . , N symbol differential phase detected signals;

a power detection unit configured to detect power of the received signal;

a soft decision demodulated data estimating unit configured to estimate a transmitted differential phase sequence according to the 1, 2, . . . , N symbol differential phase detected signals using a trellis diagram representing transitions of differential phase states of transmitted signals and a Viterbi algorithm, and configured to estimate soft decision demodulated data according to the estimated transmitted differential phase sequence, a survival path metric that transits into each state on the trellis diagram, and the detected power, wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state;

a deinterleaving unit configured to deinterleave the soft decision demodulated data according to the predetermined algorithm; and a decoding unit configured to decode the original transmitted data based on the soft decision demodulated data after the deinterleaving; and wherein, in said soft decision demodulated data estimating unit, a bit corresponding to the differential phase of a first state having a minimum survival path metric on the trellis diagram is the hard decision data, and the first survival path metric corresponds to the first survival path that transits into the first state having a minimum survival path metric, and the second survival path metric corresponds to the second survival path that transits into the second state having a minimum survival path metric, wherein the reliability information is further multiplied by the detected power.

14. A communication system comprising a transmitter for transmitting a data and a receiver for receiving the data, wherein said transmitter comprises:

a convolutional coding unit configured to convolutionally encode the transmitted data;

a converting unit configured to convert the convolutionally-encoded data into a transmission differential phase;

a differential coding unit configured to differentially encode the transmission differential phase and to map the differentially encoded data to the signal phases; and a transmission signal generation/output unit configured to generate/output a differential phase modulated signal based on the transmission signal phase, said receiver comprises:

a multiple differential phase detected signal output unit configured to calculate phase differences between a received signal and previously received signals of 1, 2, . . . , N symbols (where N is an integer greater than 2) so as to output 1, 2, . . . , N symbol differential phase detected signals;

a power detection unit configured to detect power of the received signal;

a $\rho$-multiplying unit configured to multiply the detected power by a predetermined number $\rho$;

a soft decision demodulated data estimating unit configured to estimate a transmitted differential phase sequence according to the 1, 2, . . . , N symbol differential phase detected signals using a trellis diagram representing transitions of differential phase states of transmitted signals and a Viterbi algorithm, and to estimate soft decision demodulated data according to the estimated transmitted differential phase sequence, a survival path metric that transits into each state on the trellis diagram, and the $\rho$-multiplied value of the detected power, wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state; and a decoding unit configured to decode the original transmitted data based on the soft decision demodulated data; and wherein, in said soft decision demodulated data estimating unit, a bit corresponding to the differential phase of a first state having a minimum survival path metric on the trellis diagram is the hard decision data, and the first survival path metric corresponds to the first survival path that transits into the first state having a minimum survival path metric, and the second survival path metric corresponds to the second survival path that transits into the second state having a minimum survival path metric, wherein the reliability information is further multiplied by a ρ-multiplied value of the detected power.

15. A communication system comprising a transmitter for transmitting a data and a receiver for receiving the data, wherein said transmitter comprises:
- a convolutional coding unit configured to convolutionally encode the transmitted data;
- an interleaving unit configured to interleave an order of the convolutionally-encoded data according to a predetermined algorithm;
- a converting unit configured to convert the interleaved data into a transmission differential phase;
- a differential coding unit configured to differentially encode the transmission differential phase and to map the differentially encoded data to the signal phases; and
- a transmission signal generation!output unit configured to generate/output a differential phase modulated signal based on the transmission signal phase, said receiver comprises:
- a multiple differential phase detected signal output unit configured to calculate phase differences between a received signal and previously received signals of 1, 2, ..., N symbols (where N is an integer greater than 2) so as to output 1, 2, ..., N symbol differential phase detected signals;
- a power detection unit configured to detect power of the received signal;
- a ρ-multiplying unit configured to multiply the detected power by a predetermined number ρ;
- a soft decision demodulated data estimating unit configured to estimate transmitted differential phase sequence according to the 1, 2, ..., N symbol differential phase detected signals using a trellis diagram representing transitions of differential phase states of transmitted signals and a Viterbi algorithm, and to estimate soft decision demodulated data according to the estimated transmitted differential phase sequence, a survival path metric that transits into each state on the trellis diagram, and the ρ-multiplied value of the detected power, wherein the soft decision demodulated data are estimated as the product of hard decision data and reliability information, and the reliability information is calculated by subtracting a likelihood for a first survival path metric corresponding to a first survival path that transits into a first state on the trellis diagram from a likelihood for a second survival path metric corresponding to a second survival path that transits into a second state on the trellis diagram, wherein the first state is different from the second state;
- a deinterleaving unit configured to deinterleave the soft decision demodulated data according to the predetermined algorithm; and
- a decoding unit configured to decode the original transmitted data based on the soft decision demodulated data after the deinterleaving; and wherein, in said soft decision demodulated data estimating unit, a bit corresponding to the differential phase of a first state having a minimum survival path metric on the trellis diagram is the hard decision data, and the first survival path metric corresponds to the first survival path that transits into the first state having a minimum survival path metric, and the second survival path metric corresponds to the second survival path that transits into the second state having a minimum survival path metric, wherein the reliability information is further multiplied by a ρ-multiplied value of the detected power.

* * * * *